(12) United States Patent
Xu et al.

(10) Patent No.: US 11,563,520 B2
(45) Date of Patent: Jan. 24, 2023

(54) PUNCTURING RESOURCES FOR SELF-INTERFERENCE MEASUREMENT

(71) Applicant: QUALCOMM Incorporated, San Diego, CA (US)

(72) Inventors: Huilin Xu, San Diego, CA (US); Wanshi Chen, San Diego, CA (US); Ahmed Attia Abotabl, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 17/248,982

(22) Filed: Feb. 16, 2021

(65) Prior Publication Data

US 2021/0281360 A1    Sep. 9, 2021

Related U.S. Application Data

(60) Provisional application No. 62/986,347, filed on Mar. 6, 2020.

(51) Int. Cl.
| | |
|---|---|
| *H04L 1/00* | (2006.01) |
| *H04W 72/12* | (2009.01) |
| *H04W 80/02* | (2009.01) |
| *H04W 76/27* | (2018.01) |

(52) U.S. Cl.
CPC ....... *H04L 1/0068* (2013.01); *H04W 72/1231* (2013.01); *H04W 72/1257* (2013.01); *H04W 72/1289* (2013.01); *H04W 76/27* (2018.02); *H04W 80/02* (2013.01)

(58) Field of Classification Search
CPC ... H04L 1/0068; H04L 5/0044; H04L 5/0053; H04L 5/0091; H04W 72/1231; H04W 72/1257; H04W 72/1289; H04W 76/27; H04W 80/02; H04W 24/08; H04W 72/0406
See application file for complete search history.

(56) References Cited

U.S. PATENT DOCUMENTS

| | | | |
|---|---|---|---|
| 2019/0349979 A1* | 11/2019 | Park | H04W 72/1226 |
| 2021/0258100 A1* | 8/2021 | Hassan Hussein | H04W 72/1257 |
| 2021/0391972 A1* | 12/2021 | Mun | H04L 25/023 |

FOREIGN PATENT DOCUMENTS

WO    WO-2020090122 A1 *   5/2020   ........... H04B 17/345

\* cited by examiner

*Primary Examiner* — Afshawn M Towfighi
(74) *Attorney, Agent, or Firm* — Harrity & Harrity, LLP

(57) ABSTRACT

Various aspects of the present disclosure generally relate to wireless communication. In some aspects, a user equipment (UE) may decode a downlink communication on a physical downlink shared channel (PDSCH). The downlink communication may have punctured resources. The UE may transmit, in association with the downlink communication, a first uplink communication on a physical uplink shared channel (PUSCH), and measure self-interference in the punctured resources of the downlink communication on the PDSCH that are within a threshold distance of resources of the first uplink communication on the PUSCH. Numerous other aspects are provided.

30 Claims, 16 Drawing Sheets

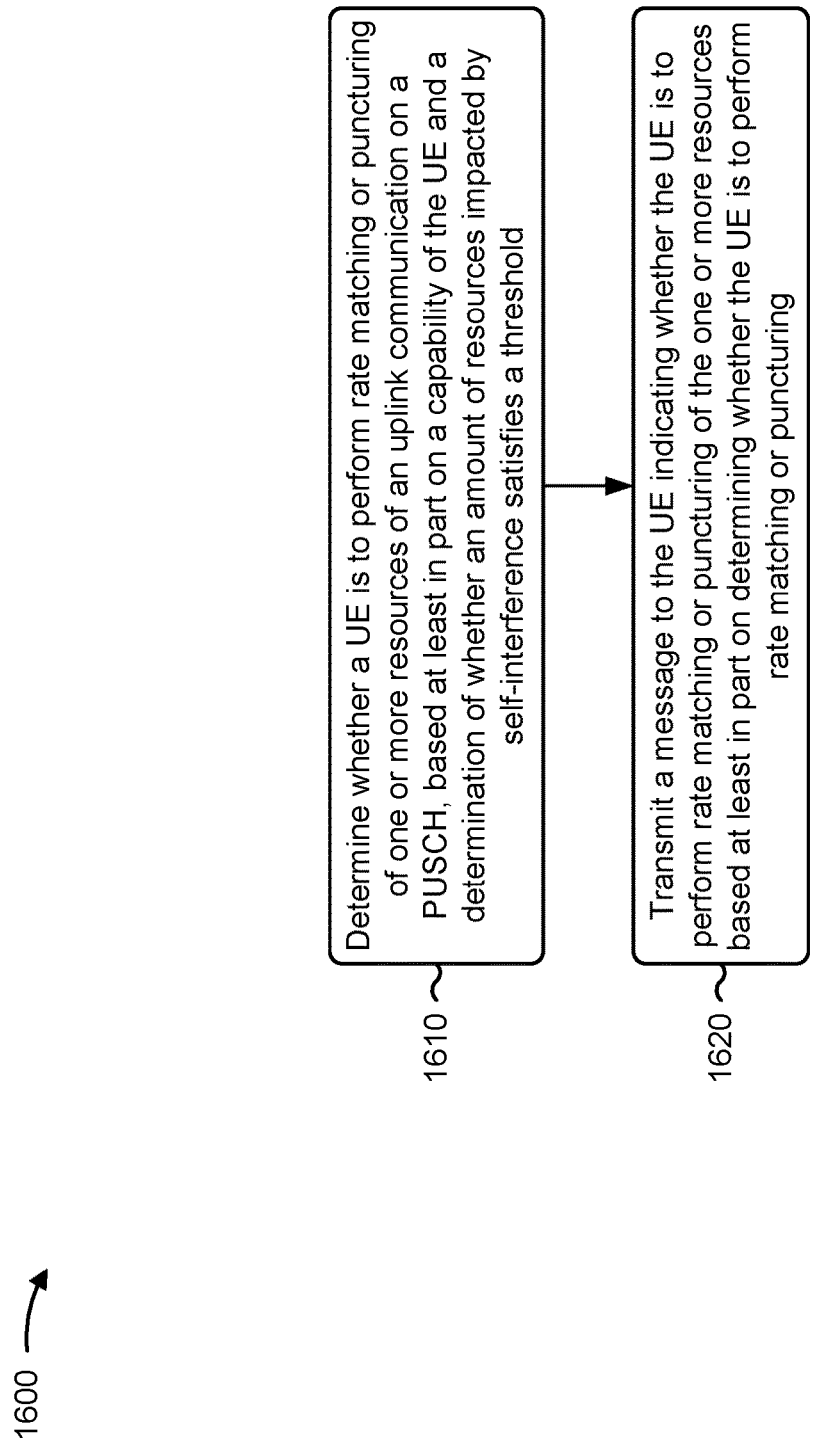

PUNCTURING RESOURCES FOR SELF-INTERFERENCE MEASUREMENT

CROSS-REFERENCE TO RELATED APPLICATION

This Patent Application claims priority to Provisional Patent Application No. 62/986,347, filed on Mar. 6, 2020, and entitled "PUNCTURING RESOURCES FOR SELF-INTERFERENCE MEASUREMENT." The disclosure of the prior Application is considered part of and is incorporated by reference into this Patent Application.

FIELD OF THE DISCLOSURE

Aspects of the present disclosure generally relate to wireless communication and to techniques and apparatuses for puncturing resources for self-interference measurement.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication, performed by a user equipment (UE), may include decoding a downlink communication on a physical downlink shared channel (PDSCH), the downlink communication having punctured resources. The method may include transmitting, in association with the downlink communication, a first uplink communication on a PUSCH, and measuring self-interference in the punctured resources of the downlink communication on the PDSCH that are within a threshold distance of resources of the first uplink communication on the PUSCH.

In some aspects, a method of wireless communication, performed by a base station, may include decoding an uplink communication from a UE on a PUSCH, the uplink communication having punctured resources. The method may include transmitting, in association with the uplink communication, a first downlink communication on a PDSCH, and measuring self-interference in the punctured resources of the uplink communication on the PUSCH that are within a threshold distance of resources of the first downlink communication on the PDSCH.

In some aspects, a method of wireless communication, performed by a UE, may include receiving a message from a base station. The method may include selectively performing, based at least in part on the message, rate matching or puncturing of one or more resources of an uplink communication on a PUSCH, and transmitting the uplink communication.

In some aspects, a method of wireless communication, performed by a base station, may include determining whether a UE is to perform rate matching or puncturing of one or more resources of an uplink communication on a PUSCH, based at least in part on a capability of the UE and a determination of whether an amount of resources impacted by self-interference satisfies a threshold. The method may include transmitting a message to the UE indicating whether the UE is to perform rate matching or puncturing of the one or more resources based at least in part on determining whether the UE is to perform rate matching or puncturing.

In some aspects, a UE for wireless communication may include a memory and one or more processors operatively coupled to the memory. The memory and the one or more processors may be configured to decode a downlink communication on a PDSCH, the downlink communication having punctured resources. The memory and the one or more processors may be configured to transmit, in association with the downlink communication, a first uplink communication on a PUSCH, and measure self-interference in the punctured resources of the downlink communication on the PDSCH that are within a threshold distance of resources of the first uplink communication on the PUSCH.

In some aspects, a base station for wireless communication may include a memory and one or more processors operatively coupled to the memory. The memory and the one or more processors may be configured to decode an uplink communication from a UE on a PUSCH, the uplink communication having punctured resources. The memory and the one or more processors may transmit, in association with the uplink communication, a first downlink communication on a PDSCH, and measure self-interference in the punctured resources of the uplink communication on the PUSCH that are within a threshold distance of resources of the first downlink communication on the PDSCH.

In some aspects, a UE for wireless communication may include a memory and one or more processors operatively coupled to the memory. The memory and the one or more processors may be configured to receive a message from a base station, selectively perform, based at least in part on the message, rate matching or puncturing of one or more resources of an uplink communication on a PUSCH, and transmit the uplink communication.

In some aspects, a base station for wireless communication may include a memory and one or more processors operatively coupled to the memory. The memory and the one or more processors may be configured to determine whether a UE is to perform rate matching or puncturing of one or more resources of an uplink communication on a PUSCH, based at least in part on a capability of the UE and a determination of whether an amount of resources impacted by self-interference satisfies a threshold. The memory and the one or more processors may be configured to transmit a message to the UE indicating whether the UE is to perform rate matching or puncturing of the one or more resources based at least in part on determining whether the UE is to perform rate matching or puncturing.

In some aspects, a non-transitory computer-readable medium may store one or more instructions for wireless communication. The one or more instructions, when executed by one or more processors of a UE, may cause the one or more processors to decode a downlink communication on a PDSCH, the downlink communication having punctured resources, transmit, in association with the downlink communication, a first uplink communication on a PUSCH, and measure self-interference in the punctured resources of the downlink communication on the PDSCH that are within a threshold distance of resources of the first uplink communication on the PUSCH.

In some aspects, a non-transitory computer-readable medium may store one or more instructions for wireless communication. The one or more instructions, when executed by one or more processors of a base station, may cause the one or more processors to decode an uplink communication from a UE on a PUSCH, the uplink communication having punctured resources, transmit, in association with the uplink communication, a first downlink communication on a PDSCH, and measure self-interference in the punctured resources of the uplink communication on the PUSCH that are within a threshold distance of resources of the first downlink communication on the PDSCH.

In some aspects, a non-transitory computer-readable medium may store one or more instructions for wireless communication. The one or more instructions, when executed by one or more processors of a UE, may cause the one or more processors to receive a message from a base station, selectively perform, based at least in part on the message, rate matching or puncturing of one or more resources of an uplink communication on a PUSCH, and transmit the uplink communication.

In some aspects, a non-transitory computer-readable medium may store one or more instructions for wireless communication. The one or more instructions, when executed by one or more processors of a base station, may cause the one or more processors to determine whether a UE is to perform rate matching or puncturing of one or more resources of an uplink communication on a PUSCH, based at least in part on a capability of the UE and a determination of whether an amount of resources impacted by self-interference satisfies a threshold, and transmit a message to the UE indicating whether the UE is to perform rate matching or puncturing of the one or more resources based at least in part on determining whether the UE is to perform rate matching or puncturing.

In some aspects, an apparatus for wireless communication may include means for decoding a downlink communication on a PDSCH, the downlink communication having punctured resources, means for transmitting, in association with the downlink communication, a first uplink communication on a PUSCH, and means for measuring self-interference in the punctured resources of the downlink communication on the PDSCH that are within a threshold distance of resources of the first uplink communication on the PUSCH.

In some aspects, an apparatus for wireless communication may include means for decoding an uplink communication from a UE on a PUSCH, the uplink communication having punctured resources, means for transmitting, in association with the uplink communication, a first downlink communication on a PDSCH, and means for measuring self-interference in the punctured resources of the uplink communication on the PUSCH that are within a threshold distance of resources of the first downlink communication on the PDSCH.

In some aspects, an apparatus for wireless communication may include means for receiving a message from a base station, means for selectively performing, based at least in part on the message, rate matching or puncturing of one or more resources of an uplink communication on a PUSCH, and means for transmitting the uplink communication.

In some aspects, an apparatus for wireless communication may include means for determining whether a UE is to perform rate matching or puncturing of one or more resources of an uplink communication on a PUSCH, based at least in part on a capability of the UE and a determination of whether an amount of resources impacted by self-interference satisfies a threshold, and means for transmitting a message to the UE indicating whether the UE is to perform rate matching or puncturing of the one or more resources based at least in part on determining whether the UE is to perform rate matching or puncturing.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 16 is a diagram illustrating an example process performed, for example, by a base station, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
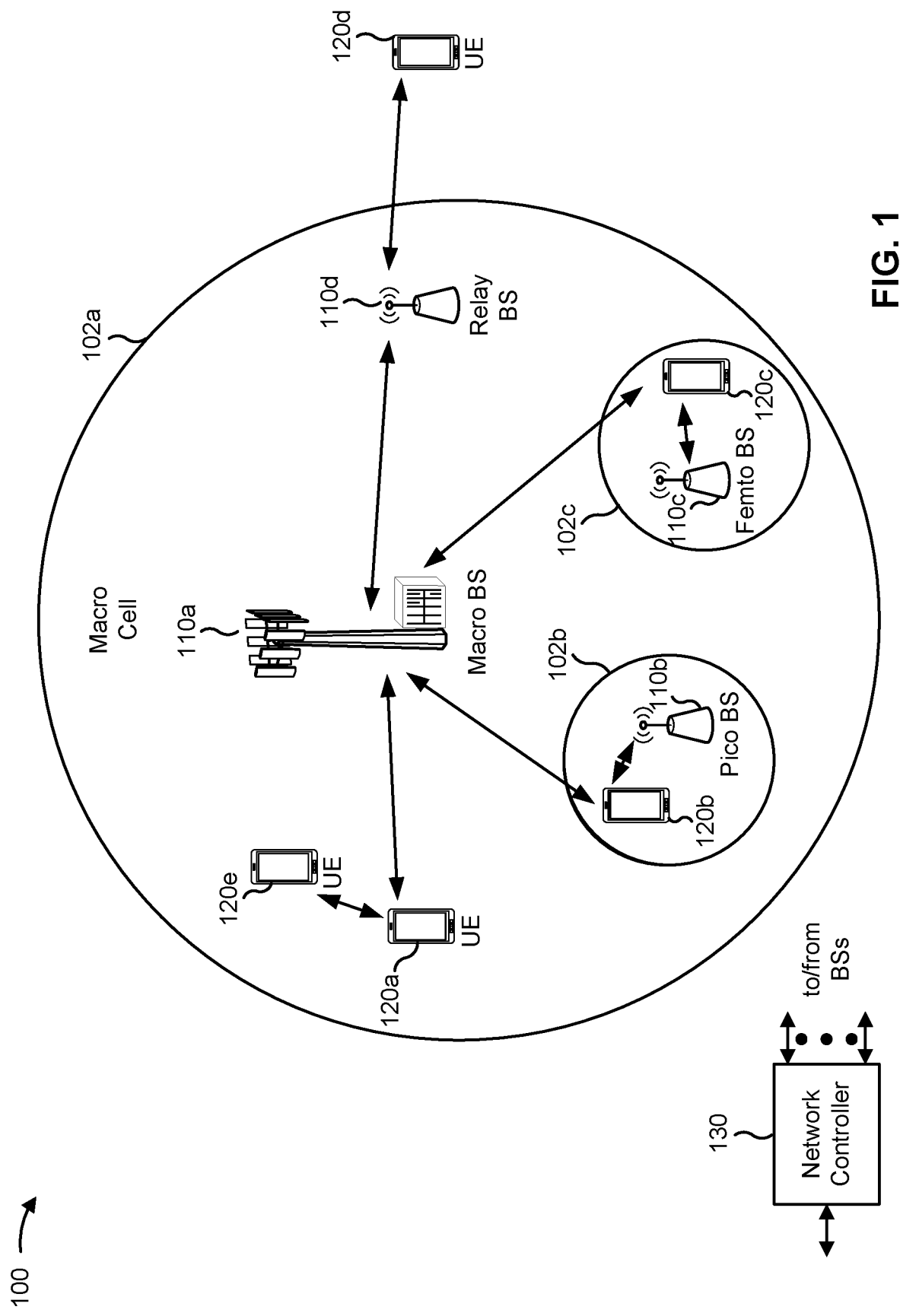
FIG. 1 is a block diagram illustrating an example of a wireless communication network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

Figure 2:
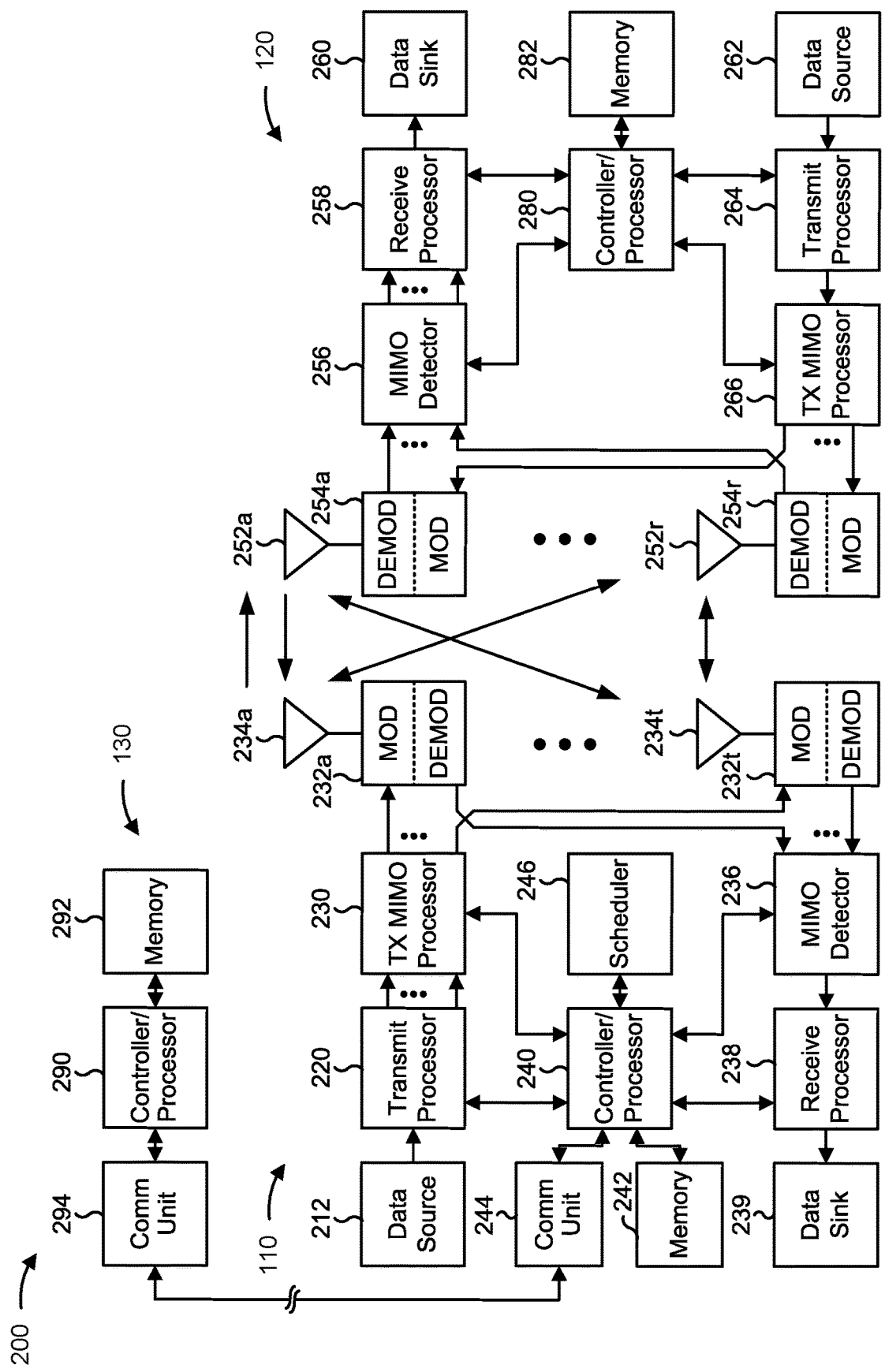
FIG. 2 is a block diagram illustrating an example of a base station in communication with a UE in a wireless communication network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s)

selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency division multiplexing (OFDM)) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of UE 120. In some aspects, UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 1-16).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of base station 110 may be included in a modem of base station 110. In some aspects, base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 1-16).

Controller/processor 240 of base station 110, controller/processor 280 of UE 120, and/or any other component(s) of FIG. 2 may perform one or more techniques associated with puncturing resources for self-interference (SI) measurement, as described in more detail elsewhere herein. For example, controller/processor 240 of base station 110, controller/processor 280 of UE 120, and/or any other component(s) of FIG. 2 may perform or direct operations of, for example, process 1300 of FIG. 13, process 1400 of FIG. 14, process 1500 of FIG. 15, process 1600 of FIG. 16, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, UE 120, and/or base station 110 to perform or direct operations of, for example, process 1300 of FIG. 13, process 1400 of FIG. 14, process 1500 of FIG. 15, process 1600 of FIG. 16, and/or other processes as described herein. In some aspects, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to transmit processor 264, receive processor 258, and/or TX MIMO processor 266 may be performed by or under the control of controller/processor 280.

In some aspects, UE 120 may include means for decoding a downlink communication on a physical downlink shared channel (PDSCH), the downlink communication having punctured resources, means for transmitting, in association with the downlink communication, a first uplink communication on a physical uplink shared channel (PUSCH), means for measuring self-interference in the punctured resources of the downlink communication on the PDSCH that are within a threshold distance of resources of the first uplink communication on the PUSCH, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, UE 120 may include means for receiving a message from a base station, means for selectively performing, based at least in part on the message, rate matching or puncturing of one or more resources of an uplink communication on a PUSCH, means for transmitting the uplink communication, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for decoding an uplink communication from a UE on a PUSCH, the uplink communication having punctured resources, means for transmitting, in association with the uplink communication, a first downlink communication on a PDSCH, means for measuring self-interference in the punctured resources of the uplink communication on the PUSCH that are within a threshold distance of resources of the first downlink communication on the PDSCH, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, base station 110 may include means for determining whether a UE is to perform rate matching or puncturing of one or more resources of an uplink communication on a PUSCH, based at least in part on a capability of the UE and a determination of whether an amount of resources impacted by self-interference satisfies a threshold, means for transmitting a message to the UE indicating whether the UE is to perform rate matching or puncturing of the one or more resources based at least in part on determining whether the UE is to perform rate matching or puncturing, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

As indicated above, FIG. 2 is provided as an example. Other examples may differ from what is described with regard to FIG. 2.

Figure 3:
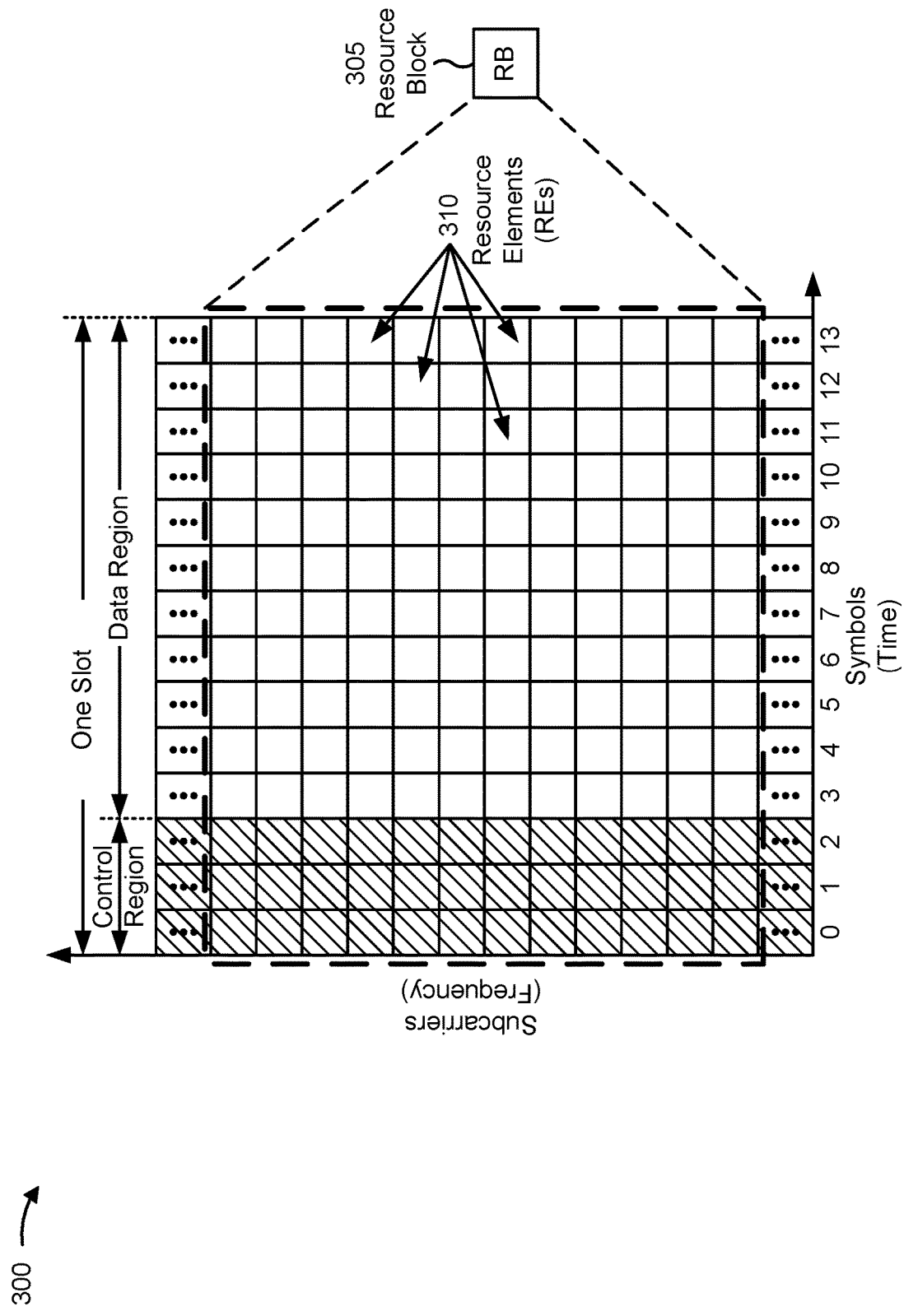
FIG. 3 is a diagram illustrating an example of a slot format, in accordance with the present disclosure.

FIG. 3 is a diagram illustrating an example 300 of a slot format, in accordance with the present disclosure. As shown in FIG. 3, time-frequency resources in a radio access network may be partitioned into resource blocks, shown by a single resource block (RB) 305. An RB 305 is sometimes referred to as a physical resource block (PRB). An RB 305 includes a set of subcarriers (e.g., 12 subcarriers) and a set of symbols (e.g., 14 symbols) that are schedulable by a base station 110 as a unit. In some aspects, an RB 305 may include a set of subcarriers in a single slot. As shown, a single time-frequency resource included in an RB 305 may be referred to as a resource element (RE) 310. An RE 310 may include a single subcarrier (e.g., in frequency) and a single symbol (e.g., in time). A symbol may be referred to as an OFDM symbol. An RE 310 may be used to transmit one modulated symbol, which may be a real value or a complex value.

In some telecommunication systems (e.g., NR), RBs 305 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing, a cyclic prefix format). A slot may be configured with a link direction (e.g., downlink or uplink) for transmission. In some aspects, the link direction for a slot may be dynamically configured. In some communications systems, such as 5G or NR, a UE may transmit a communication to a base station on a physical uplink channel (e. g., a physical uplink control channel (PUCCH), a PUSCH) in one or more slots.

As indicated above, FIG. 3 is provided as an example. Other examples may differ from what is described with respect to FIG. 3.

Figure 4:
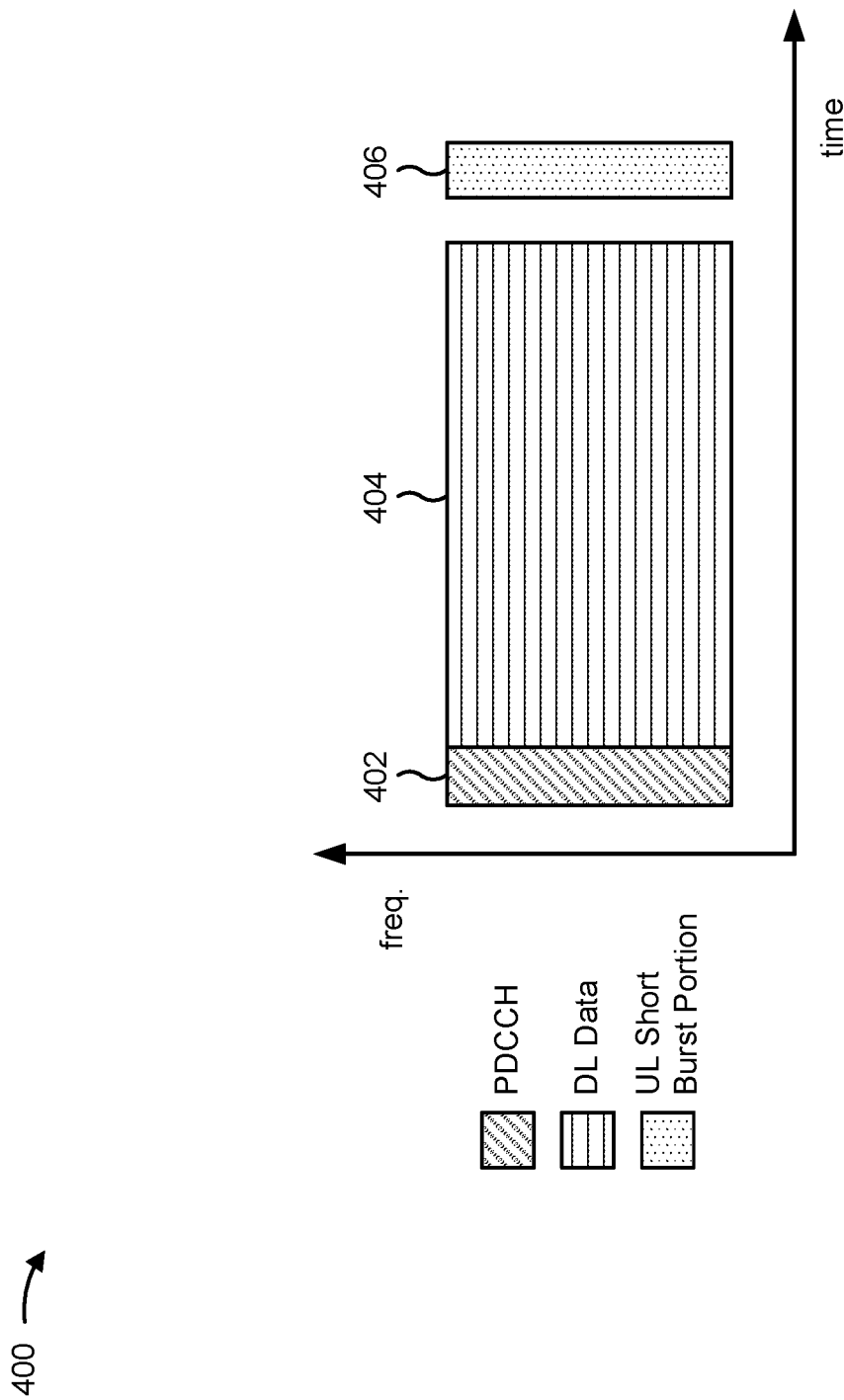
FIG. 4 is a diagram showing an example of a downlink-centric slot or wireless communication structure, in accordance with the present disclosure.

FIG. 4 is a diagram 400 showing an example of a downlink (DL)-centric slot or wireless communication structure, in accordance with the present disclosure. The DL-centric slot may include a control portion 402. Control portion 402 may exist in the initial or beginning portion of the DL-centric slot. Control portion 402 may include various scheduling information and/or control information corresponding to various portions of the DL-centric slot. In some configurations, control portion 402 may be a physical downlink control channel (PDCCH), as indicated in FIG. 4. In some aspects, control portion 402 may include legacy PDCCH information, shortened PDCCH (sPDCCH) information, a control format indicator (CFI) value (e.g., carried on a physical control format indicator channel (PCFICH)), one or more grants (e.g., downlink grants, uplink grants), and/or the like.

The DL-centric slot may also include a DL data portion 404. DL data portion 404 may sometimes be referred to as the payload of the DL-centric slot. DL data portion 404 may include the communication resources utilized to communicate DL data from the scheduling entity (e.g., UE or BS) to the subordinate entity (e.g., UE). In some configurations, DL data portion 404 may be a PDSCH.

The DL-centric slot may also include an uplink (UL) short burst portion 406. UL short burst portion 406 may sometimes be referred to as an UL burst, an UL burst portion, a common UL burst, a short burst, an UL short burst, a common UL short burst, a common UL short burst portion, and/or various other suitable terms. In some aspects, UL short burst portion 406 may include one or more reference signals. Additionally, or alternatively, UL short burst portion 406 may include feedback information corresponding to various other portions of the DL-centric slot. For example, UL short burst portion 406 may include feedback information corresponding to control portion 402 and/or data portion 404. Non-limiting examples of information that may be included in UL short burst portion 406 include an acknowledgement (ACK) signal (e.g., a PUCCH ACK, a PUSCH ACK, an immediate ACK), a negative acknowledgement (NACK) signal (e.g., a PUCCH NACK, a PUSCH NACK, an immediate NACK), a scheduling request (SR), a buffer status report (BSR), a hybrid automatic repeat request (HARQ) indicator, a channel state indication (CSI), a CQI, a sounding reference signal (SRS), a DMRS, PUSCH data, and/or various other suitable types of information. UL short burst portion 406 may include additional or alternative information, such as information pertaining to random access channel (RACH) procedures, scheduling requests, and various other suitable types of information.

As illustrated in FIG. 4, the end of DL data portion 404 may be separated in time from the beginning of UL short burst portion 406. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may exist without necessarily deviating from the aspects described herein.

As indicated above, FIG. 4 is provided as an example. Other examples may differ from what is described with regard to FIG. 4.

Figure 5:
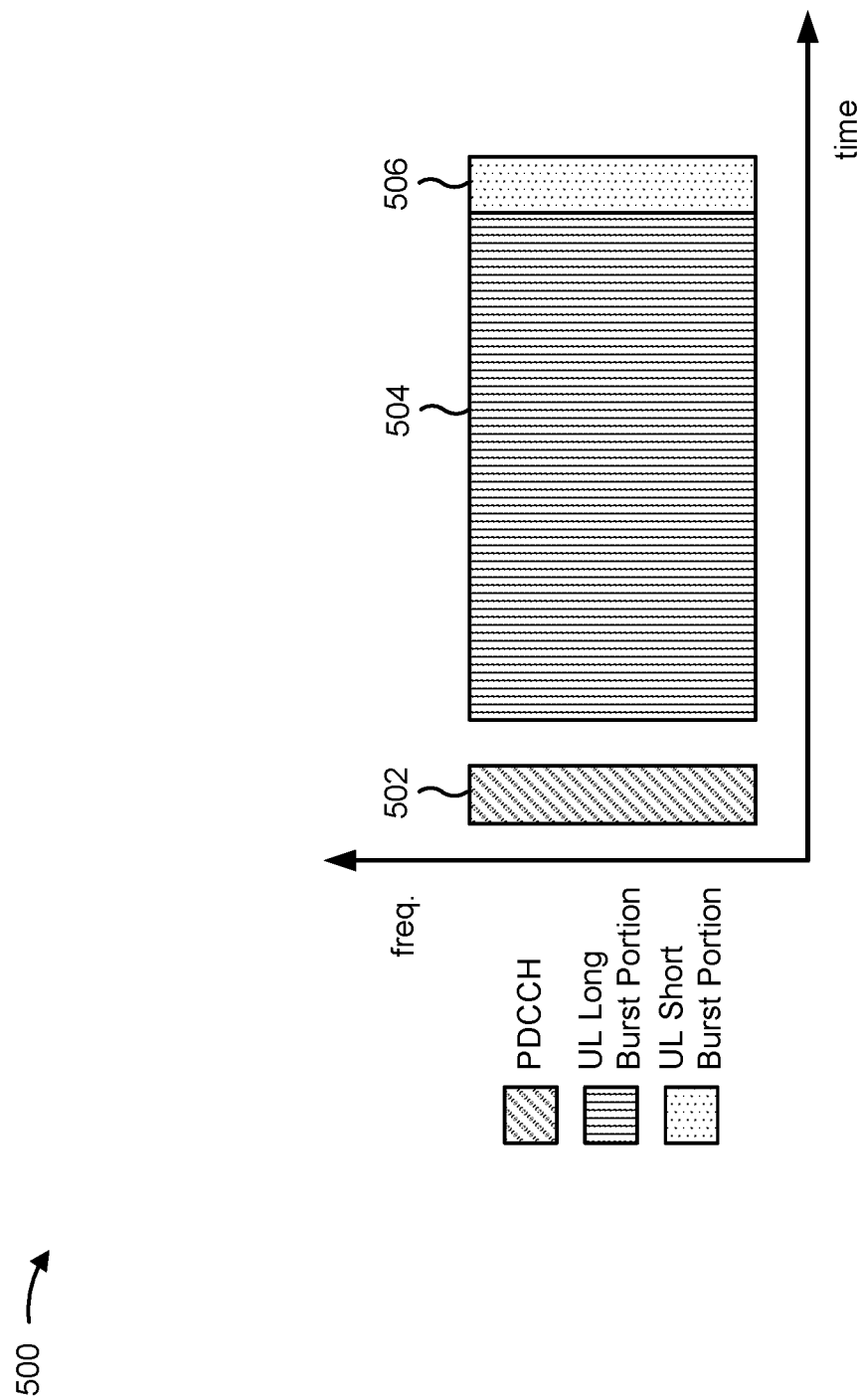
FIG. 5 is a diagram showing an example of an uplink-centric slot or wireless communication structure, in accordance with the present disclosure.

FIG. 5 is a diagram 500 showing an example of an UL-centric slot or wireless communication structure, in accordance with the present disclosure. The UL-centric slot may include a control portion 502. Control portion 502 may exist in the initial or beginning portion of the UL-centric slot. Control portion 502 in FIG. 5 may be similar to control portion 502 described above with reference to FIG. 5. The UL-centric slot may also include an UL long burst portion 504. UL long burst portion 504 may sometimes be referred to as the payload of the UL-centric slot. UL portion may refer to the communication resources utilized to communicate UL data from the subordinate entity (e.g., UE) to the scheduling entity (e.g., UE or BS). In some configurations, the control portion 502 may be a PDCCH.

As illustrated in FIG. 5, the end of the control portion 502 may be separated in time from the beginning of the UL long burst portion 504. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 506. UL short burst portion 506 in FIG. 5 may be similar to UL short burst portion 406 described above with reference to FIG. 4, and may include any of the information described above in connection with FIG. 4. The foregoing is one example of an UL-centric wireless communication structure, and alternative structures having similar features may exist without necessarily deviating from the aspects described herein.

As indicated above, FIG. 5 is provided as an example. Other examples may differ from what is described with regard to FIG. 5.

Figure 6:
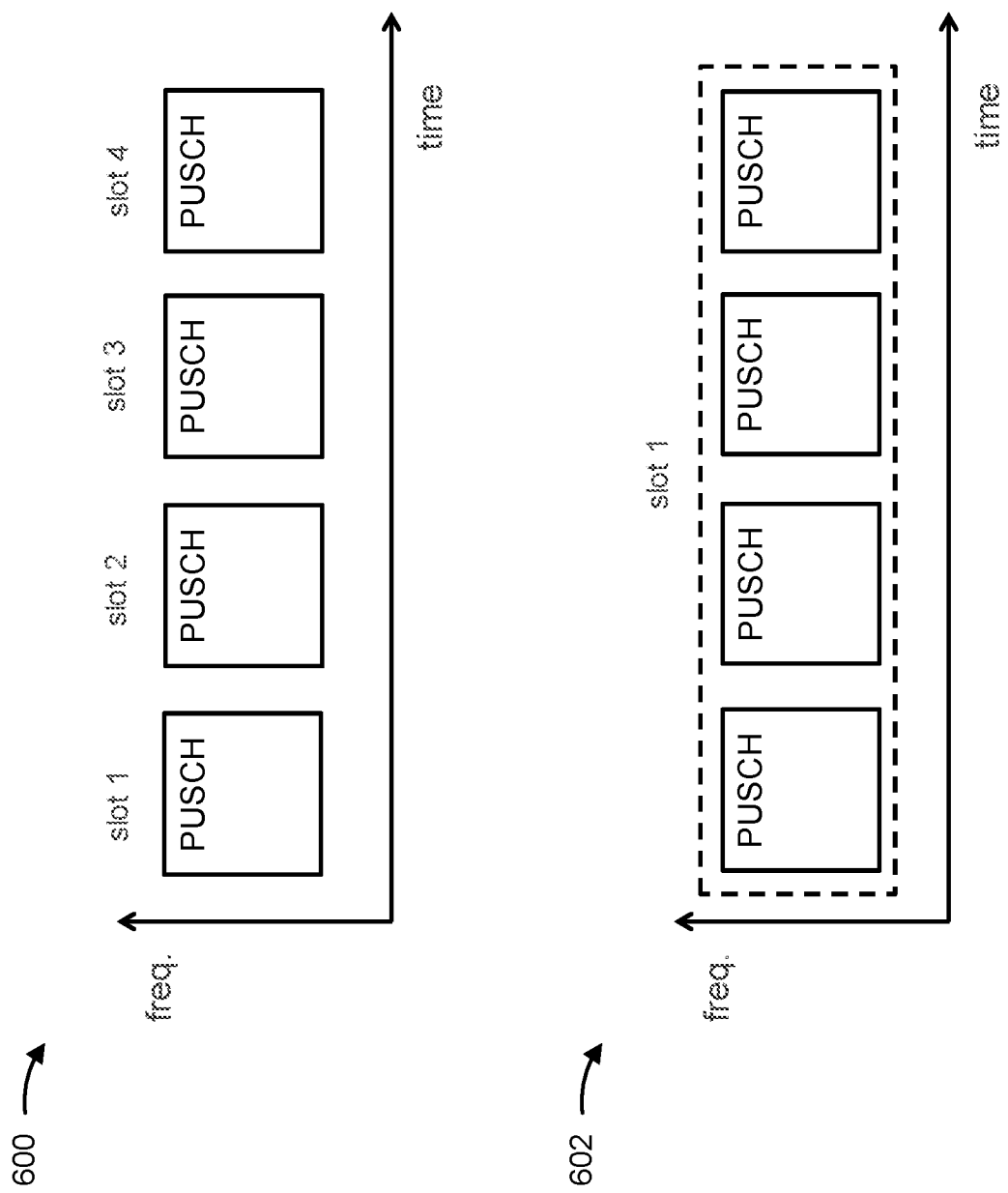
FIG. 6 illustrates examples of multi-slot transmission, in accordance with the present disclosure.

FIG. 6 illustrates examples 600, 602 of multi-slot transmission, in accordance with the present disclosure.

An uplink transmission or a downlink transmission may have the same data repeated multiple times. Slot aggregation involves repeating the same data in multiple slots, and slot aggregation can be used to improve coverage without increasing overhead, such as for ultra reliable low latency communications, enhanced mobile broadband communications, or massive machine type communications. Slot aggregation may be used for PUSCH repetitions, PUCCH repetitions, PDSCH repetitions, PDCCH repetitions, SRS repetitions, and or the like. Example 600 in FIG. 6 shows PUSCH repetitions in multiple slots, where each repetition may be on the same beam with the same transmit power. In some aspects, the PUSCH repetitions may be on different beams with different transmit powers. While example 600 shows an uplink transmission that repeats the same data four times in four slots, the uplink transmission may include more than four repetitions. Multiple repetitions across multiple slots may be referred to as inter-slot repetition. FIG. 6 also shows an example 602 of multiple repetitions in a single slot, and this may be referred to as intra-slot repetition.

As indicated above, FIG. 6 is provided as one or more examples. Other examples may differ from what is described with regard to FIG. 6.

Figure 7:
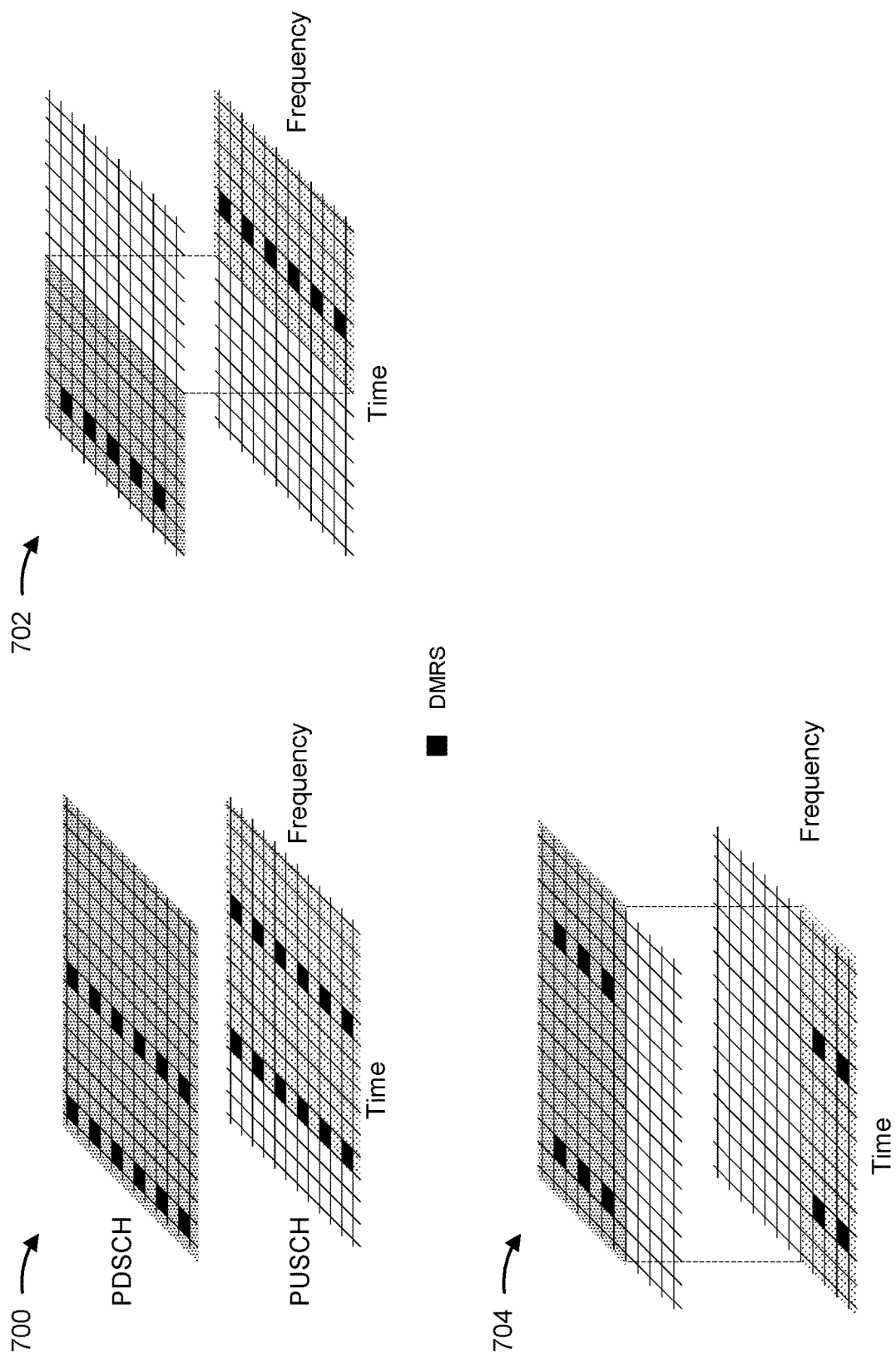
FIG. 7 illustrates examples of associated communications, in accordance with the present disclosure.

FIG. 7 illustrates examples 700, 702, 704 of associated communications, in accordance with the present disclosure.

Some communications may involve an uplink transmission that is associated with a downlink transmission. For example, an uplink communication may be associated with a downlink communication because the uplink communication is transmitted at about the same time as the downlink communication such that some resources of the uplink communication overlap or nearly overlap with resources of the downlink communication. FIG. 7 shows an example 700 of full duplex mode, an example 702 of time division duplex (TDD) with no guard time or a narrow (within a threshold size) guard time, and an example 704 of frequency division duplex (FDD) with no or a narrow guard band. When associated downlink and uplink communications are transmitted in nearby resources, simultaneously or near simultaneously, energy leakage from the uplink communication can cause interference to the downlink communication and vice versa.

At a device (UE or base station), interference may occur from transmission to reception and from reception to transmission. However, interference from transmission to reception is generally much stronger due to transmit power being stronger than receive power. This interference is called self-interference (SI).

As indicated above, FIG. 7 is provided as one or more examples. Other examples may differ from what is described with regard to FIG. 7.

Figure 8:
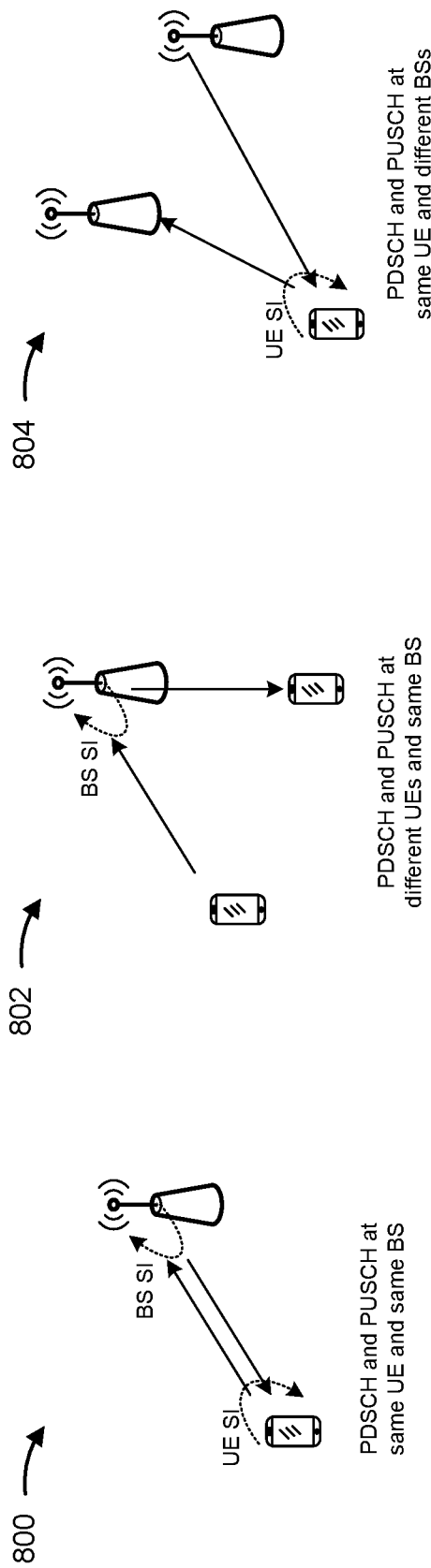
FIG. 8 illustrates examples of self-interference (SI), in accordance with the present disclosure.

FIG. 8 illustrates examples 800, 802, 804 of SI, in accordance with the present disclosure.

As shown by example 800, a UE and a base station (BS) may be in full duplex mode, in TDD mode with no or a narrow guard time, or in FDD mode with no or a narrow guard band. Transmission on the PDSCH and the PUSCH may be between the same UE and the same BS. In example 800, there may be SI at the UE and at the BS. As shown by example 802, transmission on the PDSCH and the PUSCH involves different UEs. In example 802, SI may exist at the BS, but not at the UE. As shown by example 804, transmission on the PDSCH and the PUSCH may involve the same UE but different BSs. In this example, SI may exist at the UE. Note that cross-link interference (CLI) may emerge for example 802 between UEs (from the left UE's uplink transmission to the right UE's downlink reception) or for example 804 between BSs (from the right BS's downlink transmission to the left BS's uplink reception). However, CLI strength could be much lower than SI and thus while some aspects described herein may be applicable to instances involving CLI, the various aspects described herein are focused on measuring SI.

In examples 800-804, SI for a reception signal may emerge from a transmission signal of the same device. SI at the UE may severely affect downlink signal quality, and SI at the BS may severely affect uplink signal quality. In examples 800-804, it may be necessary for the UE or the BS to measure SI so that an interference mitigation and/or cancellation algorithm can be adopted.

As indicated above, FIG. 8 is provided as one or more examples. Other examples may differ from what is described with regard to FIG. 8.

Figure 9:
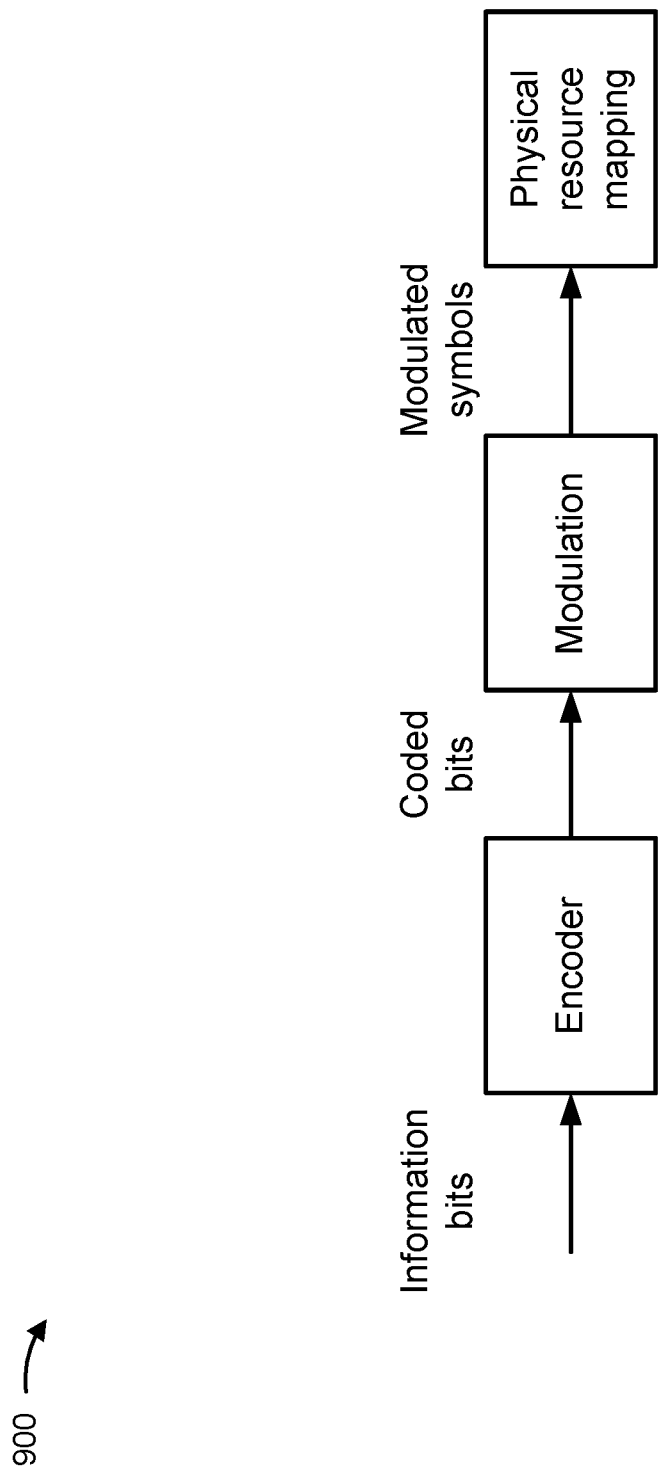
FIG. 9 illustrates an example of transmission preparation, in accordance with the present disclosure.

FIG. 9 illustrates an example 900 of transmission preparation, in accordance with the present disclosure.

FIG. 9 shows an encoder that may encode information bits into coded bits (symbols). The coded bits may be modulated into symbols and the symbols may be mapped to resources on a physical channel FIG. 9 may be used to describe a technique for measurement of SI within certain resources. The technique may be known as rate matching. Rate matching, in an SI measurement context, includes mapping modulated symbols to resources assigned to a physical channel by DCI, except for reserved resources where rate matching is applied, as if the reserved resources are not allocated to the physical channel.

As indicated above, FIG. 9 is provided as an example. Other examples may differ from what is described with regard to FIG. 9.

Figure 10:
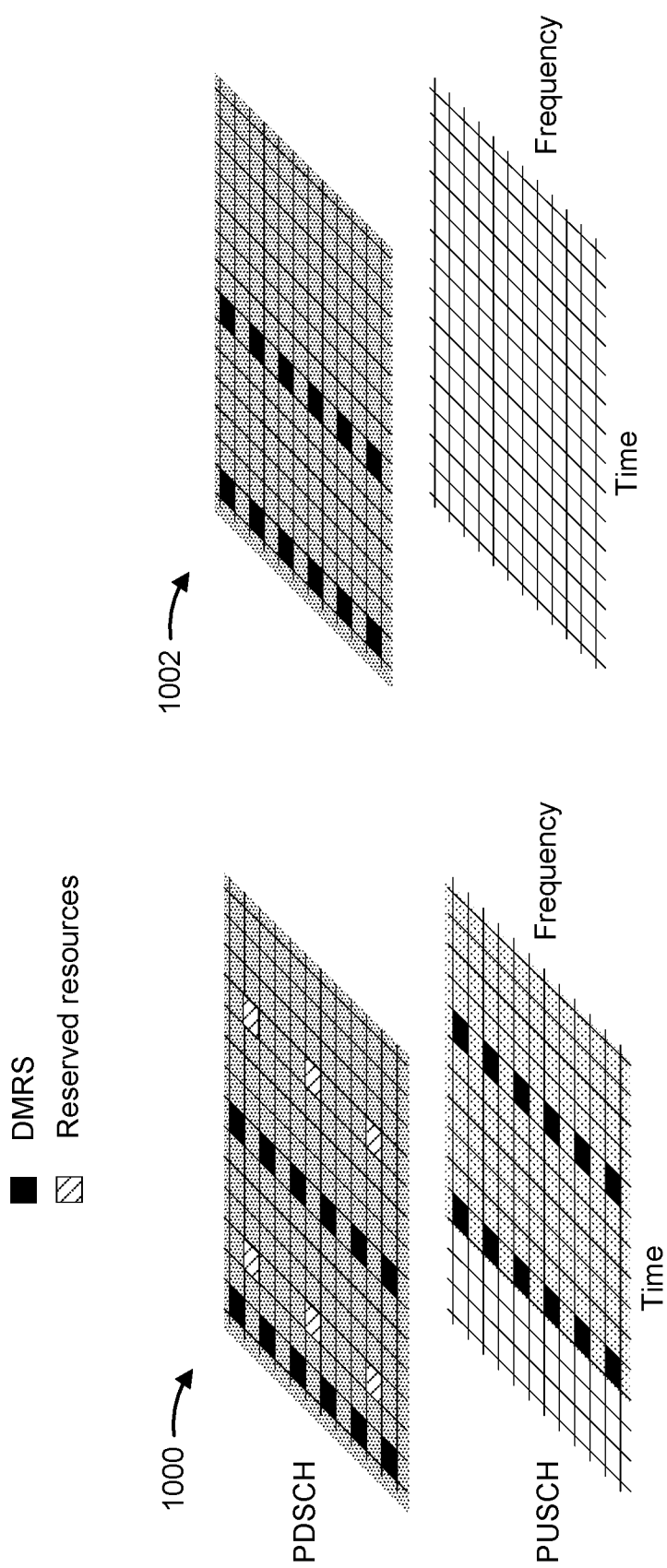
FIG. 10 illustrates examples of resources associated with SI measurement, in accordance with the present disclosure.

FIG. 10 illustrates examples 1000, 1002 of resources associated with SI measurement, in accordance with the present disclosure.

When a downlink channel is transmitted from a BS to a UE, some resources within the resources allocated to the downlink channel are reserved (not for transmission of the channel). The reserved resources may overlap with or may be near resources allocated on an uplink channel transmitted by the UE. FIG. 10 shows an example 1000 of reserved resources on a PDSCH from a BS to a UE that are overlapping or near (within a threshold distance) resources on a PUSCH from the UE to a BS. The BS may send downlink scheduling DCI and uplink scheduling DCI to the UE to schedule resources on the PDSCH and the PUSCH within overlapping resources. The BS or the UE may reserve some resources within the resources allocated to the PDSCH or PUSCH (PDSCH/PUSCH) when the BS or the UE transmits the PDSCH/PUSCH. When the UE or the BS receives the PDSCH/PUSCH, the UE or the BS may measure the SI from the PDSCH/PUSCH within reserved resources allocated to the PDSCH/PUSCH.

When a UE receives downlink scheduling DCI, UE behavior may depend on whether the UE also receives uplink scheduling DCI. With respect to rate matching, if uplink scheduling DCI is received, the UE may assume that PDSCH modulated symbols are not mapped to reserved resources within resources allocated by the downlink scheduling DCI. If uplink scheduling DCI is not received, the UE may assume that the PDSCH modulated symbols have been mapped to all resources for the PDSCH that are allocated by the downlink scheduling DCI.

A benefit of the rate matching technique is that PDSCH and PUSCH resource allocation may be dynamically adjusted according to the presence of SI. This results in a highly efficient use of resources. However, a disadvantage is that if the UE has mis-detected the uplink scheduling DCI, the PDSCH rate matching assumption may be wrong and the PDSCH may not be correctly decoded. Similarly, if the UE has mis-detected the downlink scheduling DCI, the UE may wrongly map PUSCH modulated symbols to all resources allocated by the uplink scheduling DCI and the BS may not be able to correctly decode the PUSCH. FIG. 10 shows an example 1002 of a blank PUSCH that is due to misdetection of downlink scheduling DCI and a wrong mapping of PDSCH modulated symbols. The UE and/or the BS may waste processing and signaling resources and experience increased latency due to the undecodable PDSCH.

As indicated above, FIG. 10 is provided as one or more examples. Other examples may differ from what is described with regard to FIG. 10.

According to various aspects described herein, instead of rate matching for SI measurement, a UE may puncture resources of an uplink communication and/or a BS may puncture resources of a downlink communication. Accordingly, the receiving BS may measure SI in punctured resources of the uplink communication and/or the receiving UE may measure SI in punctured resources of the downlink communication.

Puncturing is different than rate matching. For example, for puncturing, the UE and/or the BS may map modulated symbols to physical resources and then remove the modulated symbols for the punctured resources. More specifically, modulated symbols of a channel are mapped to resources assigned to the channel by DCI, except for the punctured resources, as if the punctured resources are allocated to the channel but not mapped with modulated symbols of the channel Note that, for puncturing, modulated symbols are mapped to the resources allocated to the channel that are not punctured in the same way whether puncturing is taking place or not. This is in contrast to rate matching, where reserved resources do not have modulated symbols as if these resources are not allocated to the channel in the first place. Rate matching tailors the mapping of modulated symbols to the channel, making it more susceptible to misdetection. In sum, puncturing for SI measurement may be simpler and more robust than rate matching for SI measurement. As a result, the UE may save processing and signaling resources and avoid latency that may be due to undecodable PDSCH.

Figure 11:
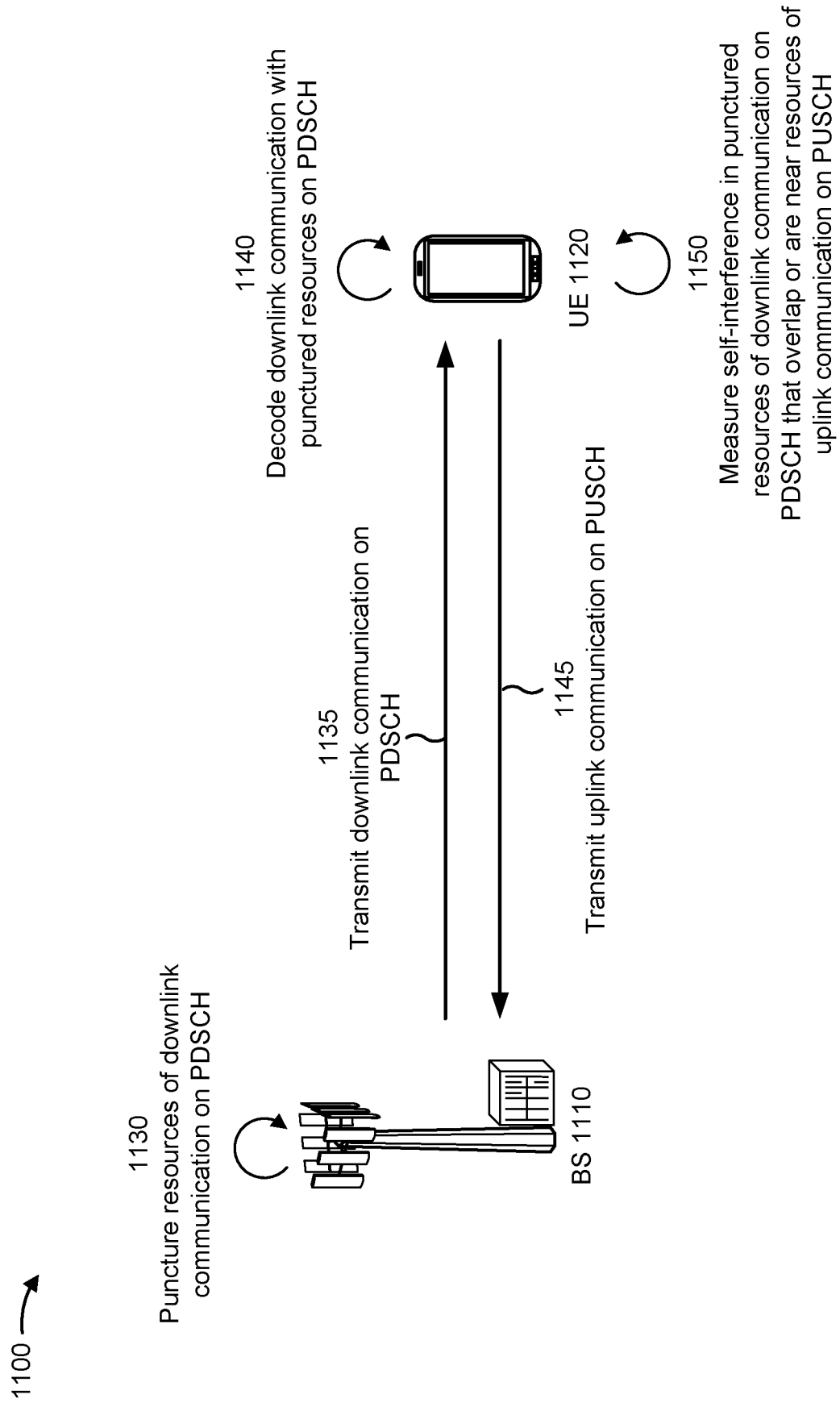
FIG. 11 is a diagram illustrating an example of puncturing resources for SI measurement, in accordance with the present disclosure.

FIG. 11 is a diagram illustrating an example 1100 of puncturing resources for SI measurement, in accordance with the present disclosure. FIG. 11 shows a BS 1110 (e.g., BS 110 depicted in FIGS. 1 and 2) and a UE 1120 (e.g., a UE 120 depicted in FIGS. 1 and 2) that may communicate with each other.

As shown by reference number 1130, BS 1110 may puncture resources of a downlink communication on a PDSCH. For example, BS 1110 may allocate resources assigned by DCI for punctured resources but not map modulated symbols to the punctured resources.

As shown by reference number 1135, BS 1110 may transmit the downlink communication to UE 1120 in association with an uplink transmission from UE 1120. A downlink communication and an uplink communication may be associated with each other if the uplink communication and the downlink communication are transmitted simultaneously or near simultaneously in full duplex mode, transmitted in TDD with no guard time or little guard time (e.g., guard time does not satisfy a size threshold), or transmitted in FDD with little or no guard band. These scenarios are depicted by examples 700-704 in FIG. 7. The uplink communication and/or the downlink communication may include intra-slot repetition and/or inter-slot repetition. In some aspects, BS 1110 may transmit an indication of the puncturing in scheduling DCI to UE 1120 such that UE 1120 may be aware of the punctured resources.

As shown by reference number 1140, UE 1120 may decode the downlink communication on the PDSCH with the punctured resources. In some aspects, UE 1120 may receive a message with uplink scheduling DCI and a message with downlink scheduling DCI, and UE 1120 may decode the downlink communication based at least in part on a determination that the uplink scheduling DCI satisfies a condition for decoding and that the downlink scheduling DCI satisfies the condition for decoding. The condition may include, for example, whether there is full duplex communication between the scheduled uplink channel and the scheduled downlink channel, whether there is a guard band or guard frequency between the scheduled uplink channel and the scheduled downlink channel, whether a size of a guard band or guard frequency meets a threshold size, whether a transmit power or a receive power satisfies a power threshold, and/or the like. UE 1120 may receive the condition in an RRC message or determine the condition from stored configuration information. UE 1120 may identify the punctured resources and know where to measure SI. As shown by reference number 1145, UE 1120 may transmit an uplink communication on a PUSCH in association with the downlink communication from BS 1110.

As shown by reference number 1150, UE 1120 may measure SI in the punctured resources of the downlink communication on the PDSCH. The UE 1120 may measure SI on the punctured resources that are within a threshold distance of particular resources (e.g., DMRS) of the uplink communication on the PUSCH. For example, UE 1120 may measure SI on punctured resources that overlap or are near the particular resources of the uplink communication. As a result, UE 1120 may more accurately measure SI and do so with a more robust operation. This may reduce a possibility that DCI is mis-detected and that the PDSCH is not decoded, and thus save power and signaling resources.

Additionally, or alternatively, UE 1120 may puncture resources in an uplink communication, and BS 1110 may decode the uplink communication with the punctured resources. In some aspects, UE 1120 may receive uplink scheduling DCI and downlink scheduling DCI and puncture the resources based at least in part on a determination that the uplink scheduling DCI satisfies a condition for puncturing and that the downlink scheduling DCI satisfies the condition for puncturing. In some aspects, BS 1110 may provide one or more rules to UE 1120 for puncturing resources. A rule may be associated with a radio network temporary identifier (RNTI) of the UE. For example, a rule may only be applicable to certain channels that are scheduled by DCIs scrambled by a set of RNTIs. In some aspects, a rule may correspond to a particular DCI format, a search space, or a scheduling control resource set. For example, a UE may puncture resources in particular locations of a channel based at least in part on a DCI format that schedules the channel.

In some aspects, BS 1110 may indicate which resources to puncture (e.g., radio resource control (RRC) message). For example, BS 1110 may specify an absolute time and frequency location of resources to be punctured, or a relative time and frequency location of resources to be punctured, based at least in part on resources assigned to a channel to be punctured and a channel that causes SI. UE 1120 may not assume a PDSCH is punctured if UE 1120 receives downlink scheduling DCI in certain resources without uplink scheduling DCI that satisfies a condition in the resources. UE 1120 may not puncture a PUSCH if UE 1120 only receives uplink scheduling DCI without downlink scheduling DCI that satisfies the condition.

In some aspects, when UE 1120 receives downlink scheduling DCI or uplink scheduling DCI, the scheduling DCI may include an indicator that indicates whether a scheduled channel is punctured by BS 1110 if the scheduled channel is a downlink channel or should be punctured by UE 1120 if the scheduled channel is an uplink channel. If the indicator is true, UE 1120 may assume the PDSCH has been punctured or should puncture the PUSCH no matter whether conditions are satisfied. If the indicator is false, UE 1120 may not assume puncturing in the PDSCH or puncture the PUSCH no matter whether conditions are satisfied.

As indicated above, FIG. 11 is provided as an example. Other examples may differ from what is described with respect to FIG. 11.

Figure 12:
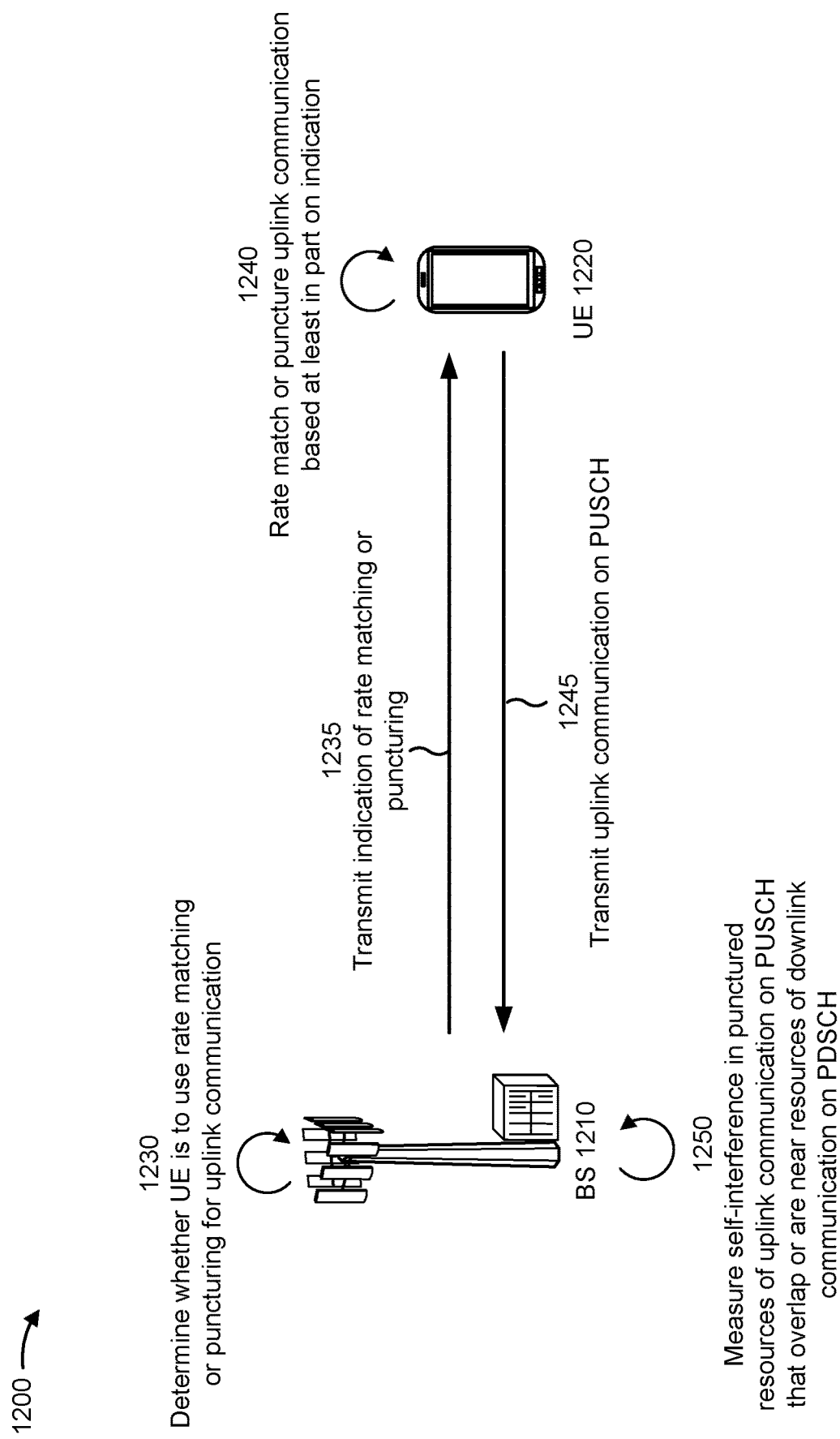
FIG. 12 is a diagram illustrating an example of switching between rate matching and puncturing for SI measurement, in accordance with the present disclosure.

FIG. 12 is a diagram illustrating an example 1200 of switching between rate matching and puncturing for SI measurement, in accordance with the present disclosure. FIG. 12 shows a BS 1210 (e.g., BS 110 depicted in FIGS. 1-2, BS 1110 depicted in FIG. 11) and a UE 1220 (e.g., a UE 120 depicted in FIGS. 1-2, UE 1120 depicted in FIG. 11) that may communicate with each other.

As shown by reference number 1230, BS 1210 may determine whether UE 1220 is to use rate matching or puncturing for an uplink communication or whether BS 1210 is to use rate matching or puncturing for a downlink communication. In some aspects, UE 1220 may dynamically determine to switch between rate matching and puncturing based at least in part on what resources are impacted by SI. For example, puncturing may be more useful than rate matching for measuring SI in a small amount of resources without impacting decoding performance of the punctured channel By contrast, rate matching may be more useful than puncturing for measuring SI in a larger amount of reserved resources.

In some aspects, BS 120 may determine to perform rate matching or puncturing based at least in part on a capability of UE 1220, which UE 1220 may signal to BS 1210. For example, if UE 1220 does not support rate matching or puncturing for SI measurement, BS 1210 may configure UE 1220 to measure SI in half duplex resources where a certain condition is not satisfied. These resources may be allocated to a channel to be measured that may otherwise cause SI when a certain condition is satisfied. In some aspects, if UE 1220 supports puncturing only, BS 1210 may only indicate puncturing. UE 1220 may further report whether UE 1220 supports dynamic enabling and disabling of puncturing based at least in part on scheduling DCIs for downlink and uplink. In some aspects, if UE 1220 does not support puncturing and supports rate matching only, BS 1210 may indicate rate matching for UE 1220. UE 1220 may further report whether UE 1220 supports dynamic enabling and disabling of rate matching based at least in part on scheduling DCIs for downlink and uplink. In some aspects, if UE 1220 supports both rate matching and puncturing, BS 1210 may indicate either rate matching or puncturing, based at least in part on a determination by BS 1210. UE 1220 may further report whether UE 1220 supports dynamic switching between rate matching, puncturing, or no such operation. UEs may have different preferences for rate matching or puncturing.

In some aspects, BS 1210 and UE 1220 may autonomously switch between rate matching and puncturing when two DCIs schedule resources on the PDSCH and the PUSCH and conditions are satisfied. For example, if a number of resources impacted by the SI satisfies a threshold number (e.g., larger than the threshold number), BS 1210 and UE 1220 may assume rate matching is to be used. If the number of resources impacted by the SI does not satisfy the threshold, BS 1210 and UE 1220 may assume puncturing is to be used. If a lot of resources are impacted by SI, a large number of resources may need to be reserved for SI measurement.

As shown by reference number 1235, BS 1210 may transmit an indication of rate matching or puncturing to UE 1220. BS 1210 may provide the indication in scheduling downlink control information (DCI). In some aspects, BS 1210 may provide the indication in a message (e.g., DCI, medium access control control element (MAC-CE), RRC message) that rate matching or puncturing is to be performed in a later allocation on the PUSCH or in a later allocation on the PDSCH. As shown by reference number 1240, UE 1220 may rate match or puncture the uplink communication based at least in part on the indication. In some aspects, UE 1220 may assume BS 1110 rate matches or punctures the downlink communication based at least in part on the indication. As shown by reference number 1245, UE 1220 may transmit the uplink communication on the PUSCH. In some aspects, UE 1220 may receive the downlink communication on the PDSCH. As shown by reference number 1250, BS 1210 may measure SI in punctured resources of the uplink communication that overlap or are near resources in a downlink communication on the PDSCH. In some aspects, UE 1220 may measure SI in punctured resources of the downlink communication that overlap or are near resources in an uplink communication on the PUSCH. As a result, BS 1210 and/or UE 1220 may more accurately measure SI based at least in part on an amount of resources impacted and/or a capability of UE 1220. This accurate SI information may result in improved communications.

As indicated above, FIG. 12 is provided as an example. Other examples may differ from what is described with respect to FIG. 12.

Figure 13:
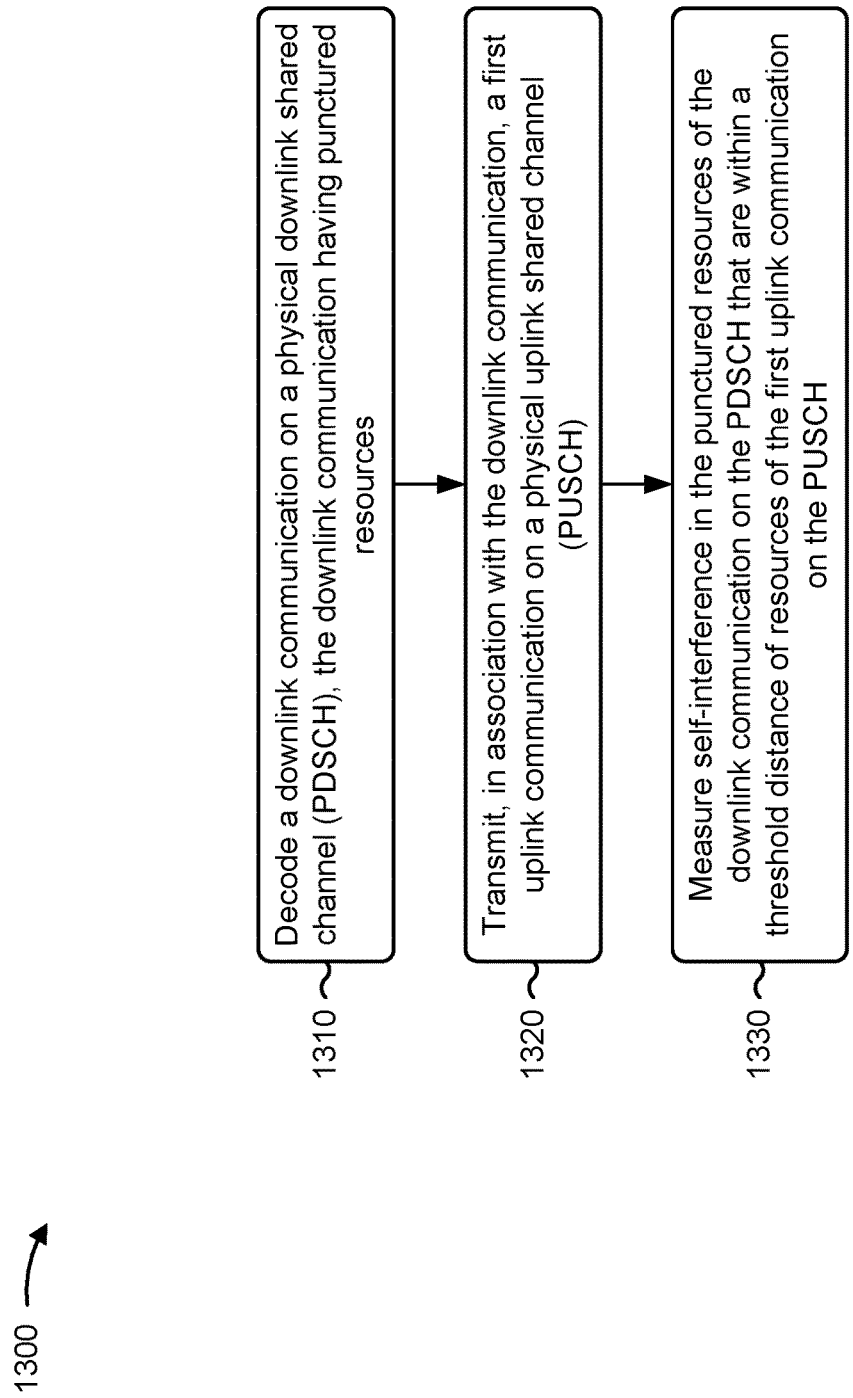
FIG. 13 is a diagram illustrating an example process performed, for example, by a UE, in accordance with the present disclosure.

FIG. 13 is a diagram illustrating an example process 1300 performed, for example, by a UE, in accordance with the present disclosure. Example process 1300 is an example where the UE (e.g., a UE 120 depicted in FIGS. 1 and 2, UE 1120 depicted in FIG. 11, UE 1220 depicted in FIG. 12) performs operations associated with puncturing resources for SI measurement.

As shown in FIG. 13, in some aspects, process 1300 may include decoding a downlink communication on a PDSCH, the downlink communication having punctured resources (block 1310). For example, the UE (e.g., using receive processor 258, transmit processor 264, controller/processor 280, memory 282) may decode a downlink communication on a PDSCH, the downlink communication having punctured resources, as described above.

As further shown in FIG. 13, in some aspects, process 1300 may include transmitting, in association with the downlink communication, a first uplink communication on a PUSCH (block 1320). For example, the UE (e.g., using receive processor 258, transmit processor 264, controller/processor 280, memory 282) may transmit, in association with the downlink communication, a first uplink communication on a PUSCH, as described above.

As further shown in FIG. 13, in some aspects, process 1300 may include measuring self-interference in the punctured resources of the downlink communication on the PDSCH that are within a threshold distance of resources of the first uplink communication on the PUSCH (block 1330). For example, the UE (e.g., using receive processor 258, transmit processor 264, controller/processor 280, memory 282) may measure self-interference in the punctured resources of the downlink communication on the PDSCH that are within a threshold distance of resources of the first uplink communication on the PUSCH, as described above.

Process 1300 may include additional aspects, such as any single aspect or any combination of aspects described below and/or in connection with one or more other processes described elsewhere herein.

In a first aspect, process 1300 includes receiving a message from a base station indicating that the UE is to measure self-interference in the punctured resources, and the self-interference is measured in the punctured resources based at least in part on receiving the message.

In a second aspect, alone or in combination with the first aspect, the message includes uplink scheduling DCI and downlink scheduling DCI, and decoding the downlink communication includes decoding the downlink communication based at least in part on a determination that the uplink scheduling DCI satisfies a condition for decoding and that the downlink scheduling DCI satisfies the condition for decoding.

In a third aspect, alone or in combination with one or more of the first and second aspects, process 1300 includes puncturing one or more resources of a second uplink communication on the PUSCH based at least in part on DCI, and transmitting the second uplink communication in association with the downlink communication.

In a fourth aspect, alone or in combination with one or more of the first through third aspects, the DCI includes uplink scheduling DCI and downlink scheduling DCI, and puncturing the one or more resources includes puncturing the one or more resources based at least in part on a determination that the uplink scheduling DCI satisfies a condition for puncturing and that the downlink scheduling DCI satisfies the condition for puncturing.

In a fifth aspect, alone or in combination with one or more of the first through fourth aspects, process 1300 includes obtaining the condition for puncturing from an RRC message or stored configuration information.

In a sixth aspect, alone or in combination with one or more of the first through fifth aspects, process 1300 includes obtaining an indication of the one or more resources to be punctured from an RRC message or stored configuration information.

In a seventh aspect, alone or in combination with one or more of the first through sixth aspects, the DCI include scheduling DCI that indicates that the UE is to one or more of: puncture the one or more resources of the second uplink communication; or assume puncturing is performed in the one or more resources in the downlink communication.

In an eighth aspect, alone or in combination with one or more of the first through seventh aspects, process 1300 includes receiving a message that indicates a rule for puncturing, where the rule is being associated with one or more of an RNTI, a DCI format, a search space, or a scheduling control resource set, and puncturing the one or more resources based at least in part on the rule for puncturing.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
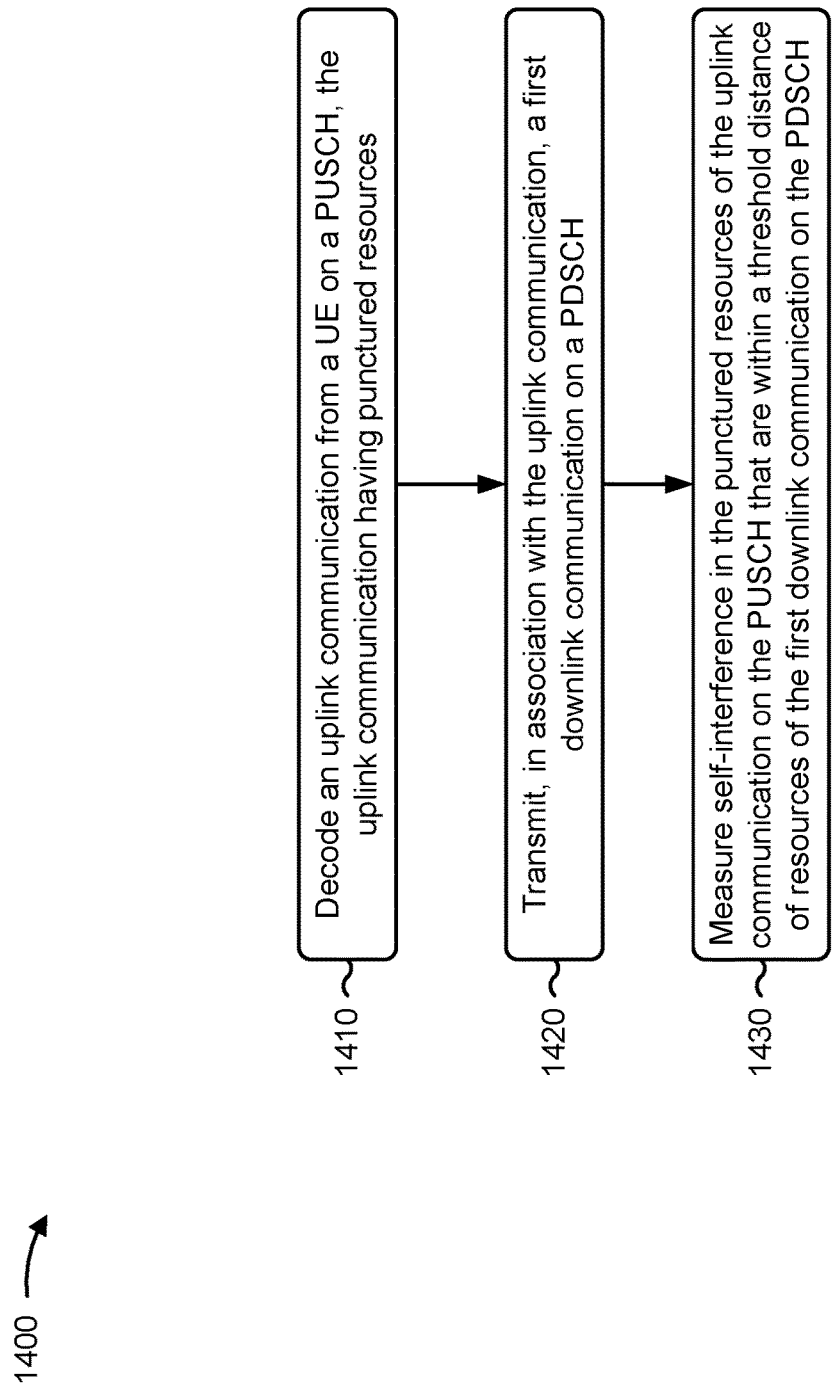
FIG. 14 is a diagram illustrating an example process performed, for example, by a base station, in accordance with the present disclosure.

FIG. 14 is a diagram illustrating an example process 1400 performed, for example, by a base station, in accordance with the present disclosure. Example process 1400 is an example where the base station (e.g., BS 110 depicted in FIGS. 1 and 2, BS 1110 depicted in FIG. 11, BS 1210 depicted in FIG. 12) performs operations associated with puncturing resources for SI measurement.

As shown in FIG. 14, in some aspects, process 1400 may include decoding an uplink communication from a UE on a PUSCH, the uplink communication having punctured resources (block 1410). For example, the base station (e.g., using transmit processor 220, receive processor 238, controller/processor 240, memory 242) may decode an uplink communication from a UE on a PUSCH, the uplink communication having punctured resources, as described above.

As further shown in FIG. 14, in some aspects, process 1400 may include transmitting, in association with the uplink communication, a first downlink communication on a PDSCH (block 1420). For example, the base station (e.g., using transmit processor 220, receive processor 238, controller/processor 240, memory 242) may transmit, in association with the uplink communication, a first downlink communication on a PDSCH, as described above.

As further shown in FIG. 14, in some aspects, process 1400 may include measuring self-interference in the punctured resources of the uplink communication on the PUSCH that are within a threshold distance of resources of the first downlink communication on the PDSCH (block 1430). For example, the base station (e.g., using transmit processor 220, receive processor 238, controller/processor 240, memory 242) may measure self-interference in the punctured resources of the uplink communication on the PUSCH that are within a threshold distance of resources of the first downlink communication on the PDSCH, as described above.

Process 1400 may include additional aspects, such as any single aspect or any combination of aspects described below and/or in connection with one or more other processes described elsewhere herein.

In a first aspect, process 1400 includes transmitting a condition for puncturing that is associated with uplink scheduling DCI and downlink scheduling DCI.

In a second aspect, alone or in combination with the first aspect, process 1400 includes transmitting scheduling downlink control information to the UE that instructs the UE to one or more of: puncture the one or more resources of the uplink communication, or assume puncturing is performed in the one or more resources in the first downlink communication.

In a third aspect, alone or in combination with one or more of the first and second aspects, process 1400 includes transmitting an indication of the one or more resources to be punctured.

In a fourth aspect, alone or in combination with one or more of the first through third aspects, process 1400 includes transmitting a message that includes a rule for puncturing, and the rule for puncturing is associated with one or more of an RNTI, a DCI format, a search space, or a scheduling control resource set.

In a fifth aspect, alone or in combination with one or more of the first through fourth aspects, process 1400 includes puncturing one or more resources of a second downlink communication on the PDSCH, transmitting DCI indicating the puncturing, and transmitting the second downlink communication in association with the uplink communication.

In a sixth aspect, alone or in combination with one or more of the first through fifth aspects, process 1400 includes transmitting a message to the UE that indicates that the UE is to measure self-interference in the punctured one or more resources.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
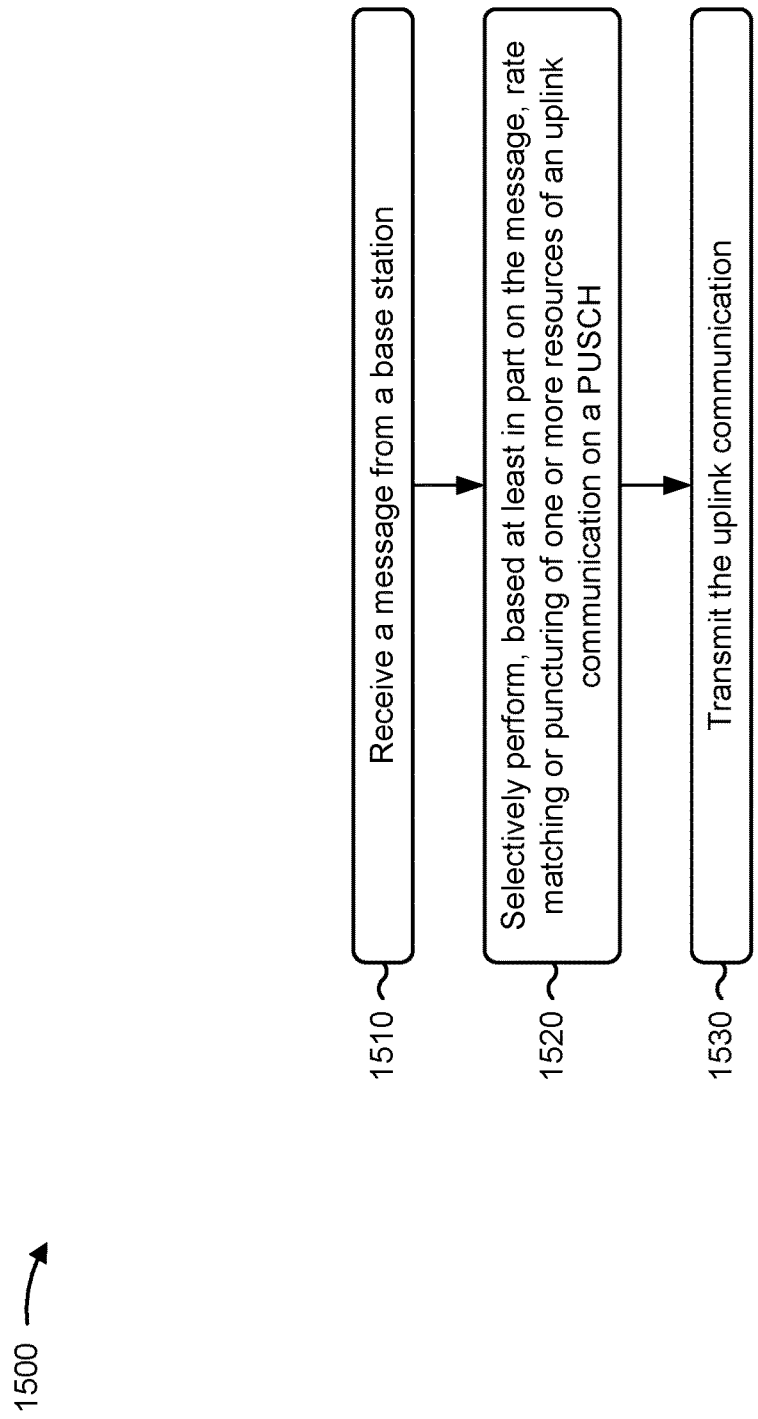
FIG. 15 is a diagram illustrating an example process performed, for example, by a UE, in accordance with the present disclosure.

FIG. 15 is a diagram illustrating an example process 1500 performed, for example, by a UE, in accordance with the present disclosure. Example process 1500 is an example where the UE (e.g., a UE 120 depicted in FIGS. 1 and 2, UE 1120 depicted in FIG. 11, UE 1220 depicted in FIG. 12) performs operations associated with switching between rate matching and puncturing for SI measurement.

As shown in FIG. 15, in some aspects, process 1500 may include receiving a message from a base station (block 1510). For example, the UE (e.g., using receive processor 258, transmit processor 264, controller/processor 280, memory 282) may receive a message from a base station, as described above.

As further shown in FIG. 15, in some aspects, process 1500 may include selectively performing, based at least in part on the message, rate matching or puncturing of one or more resources of an uplink communication on a PUSCH (block 1520). For example, the UE (e.g., using receive processor 258, transmit processor 264, controller/processor 280, memory 282) may selectively perform, based at least in part on the message, rate matching or puncturing of one or more resources of an uplink communication on a PUSCH, as described above.

As further shown in FIG. 15, in some aspects, process 1500 may include transmitting the uplink communication (block 1530). For example, the UE (e.g., using receive processor 258, transmit processor 264, controller/processor 280, memory 282) may transmit the uplink communication, as described above.

Process 1500 may include additional aspects, such as any single aspect or any combination of aspects described below and/or in connection with one or more other processes described elsewhere herein.

In a first aspect, process 1500 includes transmitting a UE capability message, to the base station, that indicates that the UE is not capable of rate matching or puncturing, and the message from the base station indicates that the UE is not to perform rate matching or puncturing and that the UE is to measure self-interference in half-duplex mode resources.

In a second aspect, alone or in combination with the first aspect, process 1500 includes transmitting a UE capability message, to the base station, that indicates that the UE is capable of puncturing and is not capable of rate matching, and the message from the base station indicates that the UE is to perform puncturing of the one or more resources.

In a third aspect, alone or in combination with one or more of the first and second aspects, process 1500 includes transmitting a UE capability message that indicates that the UE is capable of, based at least in part on scheduling downlink control information, dynamically enabling or disabling puncturing of the one or more resources.

In a fourth aspect, alone or in combination with one or more of the first through third aspects, process 1500 includes transmitting a UE capability message, to the base station, that indicates that the UE is capable of rate matching and is not capable of puncturing, and the message from the base station indicates that the UE is to perform rate matching of the one or more resources.

In a fifth aspect, alone or in combination with one or more of the first through fourth aspects, process 1500 includes transmitting a UE capability message that indicates that the UE is capable of, based at least in part on scheduling DCI, dynamically enabling or disabling rate matching of the one or more resources.

In a sixth aspect, alone or in combination with one or more of the first through fifth aspects, process 1500 includes transmitting a UE capability message that indicates that the UE is capable of either rate matching or puncturing the one or more resources.

In a seventh aspect, alone or in combination with one or more of the first through sixth aspects, process 1500 includes transmitting a UE capability message that indicates that the UE is capable of, based at least in part on scheduling DCI, dynamically switching between rate matching and puncturing of the one or more resources.

In an eighth aspect, alone or in combination with one or more of the first through seventh aspects, the message from the base station includes scheduling DCI that instructs the UE to perform one of rate matching or puncturing.

In a ninth aspect, alone or in combination with one or more of the first through eighth aspects, the message is one of downlink control information, a MAC-CE, or an RRC message that instructs the UE to perform one of rate matching or puncturing of one or more resources for a subsequent uplink communication.

In a tenth aspect, alone or in combination with one or more of the first through ninth aspects, selectively performing rate matching or puncturing includes performing one of: rate matching of the one or more resources based at least in part on a determination that an amount of resources impacted by self-interference satisfies a threshold, or puncturing of the one or more resources based at least in part on a determination that the amount of resources impacted by self-interference does not satisfy the threshold.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

FIG. 16 is a diagram illustrating an example process 1600 performed, for example, by a base station, in accordance with the present disclosure. Example process 1600 is an example where the base station (e.g., BS 110 depicted in FIGS. 1 and 2, BS 1110 depicted in FIG. 11, BS 1210 depicted in FIG. 12) performs operations associated with switching between rate matching and puncturing for SI measurement.

As shown in FIG. 16, in some aspects, process 1600 may include determining whether a UE is to perform rate matching or puncturing of one or more resources of an uplink communication on a PUSCH, based at least in part on a capability of the UE and a determination of whether an amount of resources impacted by self-interference satisfies a threshold (block 1610). For example, the base station (e.g., using transmit processor 220, receive processor 238, controller/processor 240, memory 242) may determine whether a UE is to perform rate matching or puncturing of one or more resources of an uplink communication on a PUSCH, based at least in part on a capability of the UE and a determination of whether an amount of resources impacted by self-interference satisfies a threshold, as described above.

As further shown in FIG. 16, in some aspects, process 1600 may include transmitting a message to the UE indicating whether the UE is to perform rate matching or puncturing of the one or more resources based at least in part on determining whether the UE is to perform rate matching or puncturing (block 1620). For example, the base station (e.g., using transmit processor 220, receive processor 238, controller/processor 240, memory 242) may transmit a message to the UE indicating whether the UE is to perform rate matching or puncturing of the one or more resources based at least in part on determining whether the UE is to perform rate matching or puncturing, as described above.

Process 1600 may include additional aspects, such as any single aspect or any combination of aspects described below and/or in connection with one or more other processes described elsewhere herein.

In a first aspect, the message includes scheduling DCI.

In a second aspect, alone or in combination with the first aspect, process 1600 includes transmitting another message to the UE indicating whether the UE is to perform rate matching or puncturing of one or more resources of a subsequent uplink communication, and the other message is one of DCI, a MAC-CE, or an RRC message.

In a third aspect, alone or in combination with one or more of the first and second aspects, process 1600 includes selectively is performing one of rate matching or puncturing of one or more resources of a downlink communication on a PDSCH, based at least in part on a determination of whether an amount of resources impacted by self-interference satisfies a threshold, and transmitting a message to the UE indicating whether the base station is rate matching or puncturing the one or more resources of the downlink communication.

In a fourth aspect, alone or in combination with one or more of the first through third aspects, the capability of the UE is one of: not capable of rate matching or puncturing: capable of puncturing and not capable of rate matching, capable of rate matching and not capable of puncturing, or capable of either rate matching or puncturing the one or more resources.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: decoding a downlink communication on a physical downlink shared channel (PDSCH), the downlink communication having punctured resources; transmitting, in association with the downlink communication, a first uplink communication on a physical uplink shared channel (PUSCH); and measuring self-interference in the punctured resources of the downlink communication on the PDSCH that are within a threshold distance of resources of the first uplink communication on the PUSCH.

Aspect 2: The method of Aspect 1, further comprising: receiving a message from a base station indicating that the UE is to measure self-interference in the punctured resources; and wherein the self-interference is measured in the punctured resources based at least in part on receiving the message.

Aspect 3: The method of Aspect 2, wherein the message includes uplink scheduling downlink control information (DCI) and downlink scheduling DCI, and wherein decoding the downlink communication includes decoding the downlink communication based at least in part on a determination that the uplink scheduling DCI satisfies a condition for decoding and that the downlink scheduling DCI satisfies the condition for decoding.

Aspect 4: The method of any of Aspects 1-3, further comprising: puncturing one or more resources of a second uplink communication on the PUSCH based at least in part on downlink control information (DCI); and transmitting the second uplink communication in association with the downlink communication.

Aspect 5: The method of Aspect 4, wherein the DCI includes uplink scheduling DCI and downlink scheduling DCI, and wherein puncturing the one or more resources includes puncturing the one or more resources based at least in part on a determination that the uplink scheduling DCI satisfies a condition for puncturing and that the downlink scheduling DCI satisfies the condition for puncturing.

Aspect 6: The method of Aspect 5, further comprising obtaining the condition for puncturing from a radio resource control message or stored configuration information.

Aspect 7: The method of Aspect 4, further comprising obtaining an indication of the one or more resources to be punctured from a radio resource control message or stored configuration information.

Aspect 8: The method of Aspect 4, wherein the DCI includes scheduling DCI that indicates that the UE is to one or more of: puncture the one or more resources of the second uplink communication; or assume puncturing is performed in the one or more resources in the downlink communication.

Aspect 9: The method of Aspect 4, further comprising: receiving a message that indicates a rule for puncturing, wherein the rule is associated with one or more of a radio network temporary identifier, a DCI format, a search space, or a scheduling control resource set; and puncturing the one or more resources based at least in part on the rule for puncturing.

Aspect 10: A method of wireless communication performed by a base station, comprising: decoding an uplink communication from a user equipment (UE) on a physical uplink shared channel (PUSCH), the uplink communication having punctured resources; transmitting, in association with the uplink communication, a first downlink communication on a physical downlink shared channel (PDSCH); and measuring self-interference in the punctured resources of the uplink communication on the PUSCH that are within a threshold distance of resources of the first downlink communication on the PDSCH.

Aspect 11: The method of Aspect 10, further comprising transmitting a condition for puncturing that is associated with uplink scheduling downlink control information (DCI) and downlink scheduling DCI.

Aspect 12: The method of Aspect 10 or 11, further comprising transmitting scheduling downlink control information to the UE that instructs the UE to one or more of: puncture the one or more resources of the uplink communication; or assume puncturing is performed in the one or more resources in the first downlink communication.

Aspect 13: The method of any of Aspects 10-12, further comprising transmitting an indication of the one or more resources to be punctured.

Aspect 14: The method of any of Aspects 10-13, further comprising transmitting a message that includes a rule for puncturing, wherein the rule for puncturing is associated with one or more of a radio network temporary identifier, a downlink control information format, a search space, or a scheduling control resource set.

Aspect 15: The method of any of Aspects 10-14, further comprising: puncturing one or more resources of a second downlink communication on the PDSCH; transmitting downlink control information (DCI) indicating the puncturing; and transmitting the second downlink communication in association with the uplink communication.

Aspect 16: The method of Aspect 15, further comprising transmitting a message to the UE that indicates that the UE is to measure self-interference in the punctured one or more resources.

Aspect 17: A method of wireless communication performed by a user equipment (UE), comprising: receiving a message from a base station; selectively performing, based at least in part on the message, rate matching or puncturing of one or more resources of an uplink communication on a physical uplink shared channel (PUSCH); and transmitting the uplink communication.

Aspect 18: The method of Aspect 17, further comprising transmitting a UE capability message, to the base station, that indicates that the UE is not capable of rate matching or puncturing, and wherein the message from the base station indicates that the UE is not to perform rate matching or puncturing and that the UE is to measure self-interference in half-duplex mode resources.

Aspect 19: The method of Aspect 17 or 18, further comprising transmitting a UE capability message, to the base station, that indicates that the UE is capable of puncturing and is not capable of rate matching, wherein the message from the base station indicates that the UE is to perform puncturing of the one or more resources.

Aspect 20: The method of Aspect 19, further comprising transmitting a UE capability message that indicates that the UE is capable of, based at least in part on scheduling downlink control information, dynamically enabling or disabling puncturing of the one or more resources.

Aspect 21: The method of any of Aspects 17-20, further comprising transmitting a UE capability message, to the base station, that indicates that the UE is capable of rate matching and is not capable of puncturing, wherein the message from the base station indicates that the UE is to perform rate matching of the one or more resources.

Aspect 22: The method of Aspect 21, further comprising transmitting a UE capability message that indicates that the UE is capable of, based at least in part on scheduling downlink control information, dynamically enabling or disabling rate matching of the one or more resources.

Aspect 23: The method of any of Aspects 17-22, further comprising transmitting a UE capability message that indicates that the UE is capable of either rate matching or puncturing the one or more resources.

Aspect 24: The method of any of Aspects 17-23, further comprising transmitting a UE capability message that indicates that the UE is capable of, based at least in part on scheduling downlink control information, dynamically switching between rate matching and puncturing of the one or more resources.

Aspect 25: The method of any of Aspects 17-24, wherein the message from the base station includes scheduling downlink control information that instructs the UE to perform one of rate matching or puncturing.

Aspect 26: The method of any of Aspects 17-25, wherein the message is one of downlink control information, a medium access control control element, or a radio resource control message that instructs the UE to perform one of rate matching or puncturing of one or more resources for a subsequent uplink communication.

Aspect 27: The method of any of Aspects 17-26, wherein selectively performing rate matching or puncturing includes performing one of: rate matching of the one or more resources based at least in part on a determination that an amount of resources impacted by self-interference satisfies a threshold, or puncturing of the one or more resources based at least in part on a determination that the amount of resources impacted by self-interference does not satisfy the threshold.

Aspect 28: A method of wireless communication performed by base station, comprising: determining whether a user equipment (UE) is to perform rate matching or puncturing of one or more resources of an uplink communication on a physical uplink shared channel (PUSCH), based at least in part on a capability of the UE and a determination of whether an amount of resources impacted by self-interference satisfies a threshold; and transmitting a message to the UE indicating whether the UE is to perform rate matching or puncturing of the one or more resources based at least in part on determining whether the UE is to perform rate matching or puncturing.

Aspect 29: The method of Aspect 28, wherein the message includes scheduling downlink control information.

Aspect 30: The method of Aspect 28 or 29, further comprising transmitting another message to the UE indicating whether the UE is to perform rate matching or puncturing of one or more resources of a subsequent uplink communication, wherein the other message is one of downlink control information, a medium access control control element, or a radio resource control message.

Aspect 31: The method of any of Aspects 28-30, further comprising: selectively performing one of rate matching or puncturing of one or more resources of a downlink communication on a physical downlink shared channel (PDSCH), based at least in part on a determination of whether an amount of resources impacted by self-interference satisfies a threshold; and transmitting a message to the UE indicating whether the base station is rate matching or puncturing the one or more resources of the downlink communication.

Aspect 32: The method of any of Aspects 28-31, wherein the capability of the UE is one of: not capable of rate matching or puncturing: capable of puncturing and not capable of rate matching; capable of rate matching and not capable of puncturing; or capable of either rate matching or puncturing the one or more resources.

Aspect 33: An apparatus for wireless communication at a device, comprising a processor; memory coupled with the processor; and instructions stored in the memory and executable by the processor to cause the apparatus to perform the method of one or more Aspects of Aspects 1-32.

Aspect 34: A device for wireless communication, comprising a memory and one or more processors coupled to the memory, the memory and the one or more processors configured to perform the method of one or more Aspects of Aspects 1-32.

Aspect 35: An apparatus for wireless communication, comprising at least one means for performing the method of one or more Aspects of Aspects 1-32.

Aspect 36: A non-transitory computer-readable medium storing code for wireless communication, the code comprising instructions executable by a processor to perform the method of one or more Aspects of Aspects 1-32.

Aspect 37: A non-transitory computer-readable medium storing a set of instructions for wireless communication, the set of instructions comprising one or more instructions that, when executed by one or more processors of a device, cause the device to perform the method of one or more Aspects of Aspects 1-32.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors operatively coupled to the memory, the memory and the one or more processors configured to:
      decode a downlink communication on a physical downlink shared channel (PDSCH), the downlink communication having punctured resources;
      transmit, in association with the downlink communication, a first uplink communication on a physical uplink shared channel (PUSCH); and
      measure self-interference in the punctured resources of the downlink communication on the PDSCH that are within a threshold distance of resources of the first uplink communication on the PUSCH.

2. The UE of claim 1, wherein the one or more processors are further configured to:
   receive a message from a base station indicating that the UE is to measure self-interference in the punctured resources; and
   wherein the self-interference is measured in the punctured resources based at least in part on receiving the message.

3. The UE of claim 2, wherein the message includes uplink scheduling downlink control information (DCI) and downlink scheduling DCI, and wherein the one or more processors are further configured to decode the downlink communication based at least in part on a determination that the uplink scheduling DCI satisfies a condition for decoding and that the downlink scheduling DCI satisfies the condition for decoding.

4. The UE of claim 1, wherein the one or more processors are further configured to:
   puncture one or more resources of a second uplink communication on the PUSCH based at least in part on downlink control information (DCI); and
   transmit the second uplink communication in association with the downlink communication.

5. The UE of claim 4, wherein the DCI includes uplink scheduling DCI and downlink scheduling DCI, and wherein the one or more processors are further configured to puncture the one or more resources based at least in part on a determination that the uplink scheduling DCI satisfies a condition for puncturing and that the downlink scheduling DCI satisfies the condition for puncturing.

6. The UE of claim 5, wherein the one or more processors are further configured to obtain the condition for puncturing from a radio resource control message or stored configuration information.

7. The UE of claim 4, wherein the one or more processors are further configured to obtain an indication of the one or more resources to be punctured from a radio resource control message or stored configuration information.

8. The UE of claim 4, wherein the DCI includes scheduling DCI that indicates that the UE is to one or more of: puncture the one or more resources of the second uplink communication; or assume puncturing is performed in the one or more resources in the downlink communication.

9. The UE of claim 4, wherein the one or more processors are further configured to:
   receive a message that indicates a rule for puncturing, wherein the rule is associated with one or more of a radio network temporary identifier, a DCI format, a search space, or a scheduling control resource set; and
   puncture the one or more resources based at least in part on the rule for puncturing.

10. A base station for wireless communication, comprising:
    a memory; and
    one or more processors operatively coupled to the memory, the memory and the one or more processors configured to:
       decode an uplink communication from a user equipment (UE) on a physical uplink shared channel (PUSCH), the uplink communication having punctured resources;
       transmit, in association with the uplink communication, a first downlink communication on a physical downlink shared channel (PDSCH); and
       measure self-interference in the punctured resources of the uplink communication on the PUSCH that are within a threshold distance of resources of the first downlink communication on the PDSCH.

11. The base station of claim 10, wherein the one or more processors are further configured to transmit a condition for puncturing that is associated with uplink scheduling downlink control information (DCI) and downlink scheduling DCI.

12. The base station of claim 10, wherein the one or more processors are further configured to transmit an indication of the one or more resources to be punctured.

13. The base station of claim 10, wherein the one or more processors are further configured to transmit a message that includes a rule for puncturing, wherein the rule for puncturing is associated with one or more of a radio network temporary identifier, a downlink control information format, a search space, or a scheduling control resource set.

14. The base station of claim 10, wherein the one or more processors are further configured to:
    puncture one or more resources of a second downlink communication on the PDSCH;
    transmit downlink control information (DCI) indicating the puncturing; and
    transmit the second downlink communication in association with the uplink communication.

15. The base station of claim 14, wherein the one or more processors are further configured to transmit a message to the UE that indicates that the UE is to measure self-interference in the punctured one or more resources.

16. A user equipment (UE) for wireless communication, comprising:
- a memory; and
- one or more processors operatively coupled to the memory, the memory and the one or more processors configured to:
  - receive a message from a base station;
  - selectively perform, based at least in part on the message, rate matching or puncturing of one or more resources of an uplink communication on a physical uplink shared channel (PUSCH); and
  - transmit the uplink communication.

17. The UE of claim 16, wherein the one or more processors are further configured to transmit a UE capability message, to the base station, that indicates that the UE is not capable of rate matching or puncturing, and wherein the message from the base station indicates that the UE is not to perform rate matching or puncturing and that the UE is to measure self-interference in half-duplex mode resources.

18. The UE of claim 16, wherein the one or more processors are further configured to transmit a UE capability message, to the base station, that indicates that the UE is capable of puncturing and is not capable of rate matching, wherein the message from the base station indicates that the UE is to perform puncturing of the one or more resources.

19. The UE of claim 18, wherein the one or more processors are further configured to transmit a UE capability message that indicates that the UE is capable of, based at least in part on scheduling downlink control information, dynamically enabling or disabling puncturing of the one or more resources.

20. The UE of claim 16, wherein the one or more processors are further configured to transmit a UE capability message, to the base station, that indicates that the UE is capable of rate matching and is not capable of puncturing, wherein the message from the base station indicates that the UE is to perform rate matching of the one or more resources.

21. The UE of claim 20, wherein the one or more processors are further configured to transmit a UE capability message that indicates that the UE is capable of, based at least in part on scheduling downlink control information, dynamically enabling or disabling rate matching of the one or more resources.

22. The UE of claim 16, wherein the one or more processors are further configured to transmit a UE capability message that indicates that the UE is capable of either rate matching or puncturing the one or more resources.

23. The UE of claim 22, wherein the one or more processors are further configured to transmit a UE capability message that indicates that the UE is capable of, based at least in part on scheduling downlink control information, dynamically switching between rate matching and puncturing of the one or more resources.

24. The UE of claim 16, wherein the message from the base station includes scheduling downlink control information that instructs the UE to perform one of rate matching or puncturing.

25. The UE of claim 16, wherein the message is one of downlink control information, a medium access control control element, or a radio resource control message that instructs the UE to perform one of rate matching or puncturing of one or more resources for a subsequent uplink communication.

26. The UE of claim 16, wherein the one or more processors are further configured to selectively perform rate matching or puncturing by performing one of:
- rate matching of the one or more resources based at least in part on a determination that an amount of resources impacted by self-interference satisfies a threshold, or
- puncturing of the one or more resources based at least in part on a determination that the amount of resources impacted by self-interference does not satisfy the threshold.

27. A base station for wireless communication, comprising:
- a memory; and
- one or more processors operatively coupled to the memory, the memory and the one or more processors configured to:
  - determine whether a user equipment (UE) is to perform rate matching or puncturing of one or more resources of an uplink communication on a physical uplink shared channel (PUSCH), based at least in part on a capability of the UE and a determination of whether an amount of resources impacted by self-interference satisfies a threshold; and
  - transmit a message to the UE indicating whether the UE is to perform rate matching or puncturing of the one or more resources based at least in part on determining whether the UE is to perform rate matching or puncturing.

28. The base station of claim 27, wherein the one or more processors are further configured to transmit another message to the UE indicating whether the UE is to perform rate matching or puncturing of one or more resources of a subsequent uplink communication, wherein the other message is one of downlink control information, a medium access control control element, or a radio resource control message.

29. The base station of claim 27, wherein the one or more processors are further configured to:
- selectively perform one of rate matching or puncturing of one or more resources of a downlink communication on a physical downlink shared channel (PDSCH), based at least in part on a determination of whether an amount of resources impacted by self-interference satisfies a threshold; and
- transmit a message to the UE indicating whether the base station is rate matching or puncturing the one or more resources of the downlink communication.

30. The base station of claim 27, wherein the capability of the UE is one of: not capable of rate matching or puncturing; capable of puncturing and not capable of rate matching; capable of rate matching and not capable of puncturing; or capable of either rate matching or puncturing the one or more resources.

* * * * *